US011604988B2

(12) United States Patent
Swett et al.

(10) Patent No.: US 11,604,988 B2
(45) Date of Patent: Mar. 14, 2023

(54) ARTIFICIAL INTELLIGENCE REASONING SYSTEM

(71) Applicant: The Johns Hopkins University, Baltimore, MD (US)

(72) Inventors: Bruce A. Swett, Fulton, MD (US); Corban G. Rivera, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 301 days.

(21) Appl. No.: 16/850,192

(22) Filed: Apr. 16, 2020

(65) Prior Publication Data

US 2020/0334531 A1 Oct. 22, 2020

Related U.S. Application Data

(60) Provisional application No. 62/835,653, filed on Apr. 18, 2019.

(51) Int. Cl.
*G06N 3/08* (2006.01)
*G06F 9/48* (2006.01)
*G06N 20/00* (2019.01)

(52) U.S. Cl.
CPC .......... *G06N 3/08* (2013.01); *G06F 9/4881* (2013.01); *G06N 20/00* (2019.01)

(58) Field of Classification Search
CPC ......... G06N 3/08; G06N 20/00; G06F 9/4881
USPC ........................................................ 706/21
See application file for complete search history.

(56) References Cited

U.S. PATENT DOCUMENTS

2019/0102676 A1* 4/2019 Nazari ................ G06N 3/0472

FOREIGN PATENT DOCUMENTS

WO WO 20181846666 * 10/2018 ............. G06N 20/00

OTHER PUBLICATIONS

Kaiser et al., "One Model to Learn Them All", arXiv:1706.05137v1 (Jun. 16, 2017), 10 pages.

* cited by examiner

*Primary Examiner* — John Q Chavis
(74) *Attorney, Agent, or Firm* — Sung T. Kim

(57) ABSTRACT

Methods, systems, apparatuses, and computer programs, are described for generalizing a learned behavior across different tasks. In one aspect, a method includes obtaining first data that describes sensed attributes of a first environmental state, obtaining second data that defines a target end state after performance of a particular task, obtaining first output data generated by an affective experience module that represents a particular behavior to be performed by an agent system to complete the particular task in the environment, providing, as an input data to a machine learning model that has been trained to generate second output data indicative of a particular behavior that can be used to complete the task in the environment based on processing, by the machine learning model, of the input data, the input data comprising the first data, the second data, and the first output data, obtaining the second output data generated by the machine learning model, and selecting a particular behavior for enactment to complete the particular task based on the second output data.

20 Claims, 13 Drawing Sheets

ARTIFICIAL INTELLIGENCE REASONING SYSTEM

CROSS-REFERENCE TO RELATED APPLICATIONS

This application claims priority under 35 U.S.C. § 119(e) to U.S. Provisional Patent Application Ser. No. 62/835,653, filed on Apr. 18, 2019, which is expressly incorporated by reference herein in its entirety.

FIELD

This specification generally relates to artificial intelligence.

BACKGROUND

Conventional machine learning models have proven to be accurate when trained to perform a single task. In some instances, a conventional machine learning model that has been trained to perform a particular task can perform that one particular task more efficiently than a human person. However, conventional machine learning models falter when asked to perform a different task than the task for which the conventional machine learning model was trained to perform.

SUMMARY

According to one innovative aspect of the present disclosure, a method for generalizing a learned behavior across different tasks is disclosed. In one aspect, the method can include actions of obtaining first data generated by one or more sensors, wherein the first data describes one or more sensed attributes of a first environmental state of an environment, obtaining second data, wherein the second data defines a target end state after performance of a particular task, obtaining first output data generated by an affective experience module, the first output data representing a particular behavior to be performed by an agent system to complete the particular task in the environment, wherein the affective experience module is trained to generate the first output data as a result of processing, by the affective experience module, the first data, the second data, and third data organized by the affective experience module that includes a historical success rate of a particular behavior when the particular behavior was performed to complete the particular task in a historical environment that corresponds to the first environmental state, providing, as an input data to a machine learning model that has been trained to generate second output data indicative of a particular behavior that can be used to complete the task in the environment based on processing, by the machine learning model, of the input data, the input data comprising the first data, the second data, and the first output data, obtaining the second output data generated by the machine learning model, and selecting a particular behavior for enactment to complete the particular task based on the second output data.

Other versions include corresponding systems, apparatus, and computer programs to perform the actions of methods defined by instructions encoded on computer readable storage devices.

These and other versions may optionally include one or more of the following features. For instance, in some implementations, the historical environment can correspond to the first environmental state if the historical environment satisfies a predetermined level of similarity to the first environmental state.

In some implementations, the affective experience module can include one or more neural networks.

In some implementations, the affective experience module can include a collaborative filtering model.

In some implementations, the method can further include instructing the agent system to enact the particular behavior to complete the particular task, and generating a predicted environmental state of the environment, wherein the predicted environmental state is an expected environmental state after successful completion of the particular task, by the agent system, using the particular behavior.

In some implementations, the predicted environmental state can be determined based on output data generated by a neural network that has been trained to generate output data representing a predicted environmental state based on the neural network processing input data that includes (i) data representing the particular task, (ii) data representing the first environmental state, and (iii) data that represents the particular behavior.

In some implementations, the method can further include: after the agent system enacts the particular behavior: obtaining fourth data generated by the one or more sensors, wherein the fourth data describes one or more sensed attributes of a second environmental state of the environment, the second environmental state representative of an actual environmental state of the environment after the agent system enacts the particular behavior, determining a level of similarity between the second environmental state and the predicted environmental state, and determining that the enactment, by the agent system, of the particular behavior to complete the task was successful or not successful based on the level of similarity between the second environmental state and the predicted environmental state.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The present disclosure includes methods, systems, and computer programs for implementing an artificial intelligence reasoning system (AIRS). AIRS is a computing model that is designed and trained to reason in a manner similar to the human brain with regards to processing of information and selection of behaviors for use in performing a particular task given a particular environment. In particular, in some implementations, AIRS can be used to autonomously select and trigger performance of one or more behaviors by a robotic system, a sensory system, an information system, or any combination thereof.

In particular, AIRS is trained to recognize that a previously learned behavior that was used to perform a first task can later be selected and used to perform a different task. This functionality gives rise to a level of artificial general intelligence that can enable AIRS to generalize a learned behavior used to perform a first task for selection and use in performing one or more different tasks. AIRS can make such generalizations based, at least in part, on a level of similarities that exist between the environment at the time of performance of the previously learned behavior used to perform the first task and the current environment represented by real-time sensor data obtained by AIRS.

AIRS can build on this fundamental operation of behavior generalization and selection to systematically perform projects. For example, AIRS can deconstruct any problem or project into parts or tasks, with each part or task having a corresponding set of general principles that define success and failure. AIRS can further select and trigger enactment of behaviors that, when performed by a robotic system, a sensor system, an information system, or the like, are either successful or non-successful in completing specific goals required in order to complete the task. If a task is successfully performed, AIRS can continue selecting behaviors to perform the remaining tasks of a project, until the project is complete. In the event of unsuccessful performance of a task, AIRS can dynamically reassess the environmental situation, then select and execute one or more different behaviors to perform the task. AIRS can continue to systematically execute each task of the project until the project is complete.

Figure 1:
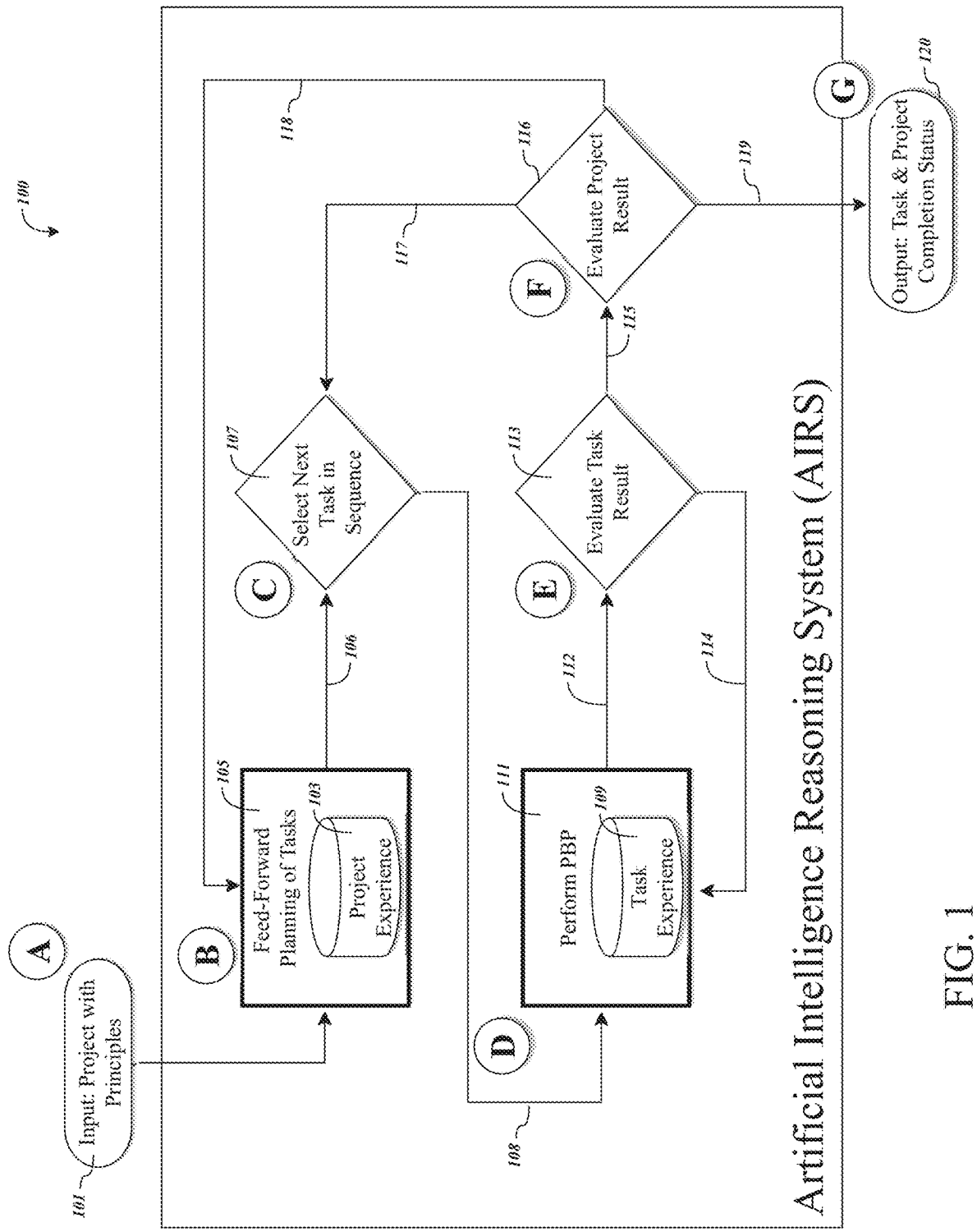
FIG. 1 is a diagram showing an example of an artificial intelligence reasoning system.

FIG. 1 is a diagram showing an example of an artificial intelligence reasoning system 100 that can be used to complete a project. The system 100 can include a feed-forward planning of tasks (FFPT) module 105 and a perception-behavior-perception (PBP) module 111. The feed-forward planning of tasks (FFPT) module 105 can access and use data stored in the project experience database 103. The perception-behavior-perception (PBP) module 111 can access and use data stored in the task experience database 109. For purposes of this specification, the term module can include one or more software components, one or more hardware components, or any combination thereof, that can be used to realize the functionality attributed to a respective module by this specification. A software component can include, for example, one or more software instructions that, when executed, cause a computer to realize the functionality attributed to a respective module by this specification. A hardware component can include, for example, one or more processors such as a central processing unit (CPU) or graphical processing unit (GPU) that is configured to execute the software instructions to cause the one or more processors to realize the functionality attributed to a module by this specification, a memory device configured to store the software instructions, or a combination thereof. Alternatively, a hardware component can include one or more circuits such as a field programmable gate array (FPGA), an application specific integrated circuit (ASIC), or the like, that has been configured to perform operations using hard-wired logic to realize the functionality attributed to a module by this specification.

The project experience database 103 can inform generation of a sequence of tasks by the FFPT module 105. The task experience database 109 can inform performance of one or more behaviors performed by the PBP 111. Decision elements such as select next task in sequence 107 and evaluate task result 113 are shown for illustration purposes and can be considered aspects of processes generally contained within the FFPT 105 and the PBP 111. Evaluate project result 116 is a decision point of the system 100 related to output of the feed-forward planning of tasks 105 and the PBP 111.

With reference to FIG. 1, high-level execution of an artificial intelligence reasoning system, or AIRS, 100 will be described using alphabetic stages starting at stage A and continuing to stage G. In stage A, input 101 is sent to the FFPT module 105. The input 101 can include data representing a definition of the project to be completed by the system 100. In some implementations, the data representing the definition of the project can include any description of a project that can be used by the FFPT 105 to develop a sequence of tasks to complete the project. For example, in some implementations, data representing a definition of a project can include an explicit list of a sequence of tasks that are required to complete the project. In such implementations, the data representing the definition of the project can also include a success principle, failure principle, or both, for each task that is required to complete the project. However, in some implementations, for example, data representing a project definition can include a more general description of a task such as "navigate from point A to point B without hitting a human."

At stage B of FIG. 1, the FFPT module 105 can receive the input 101 that includes data representing a project definition. The FFPT module 105 can determine a sequence of tasks to be performed to complete the project. In some implementations, if the project definition includes a sequence of tasks that is explicitly defined, then the FFPT module 105 can obtain data representing the sequence of tasks identified by the project definition. In other implementations, if the data representing the project definition does not include a sequence of tasks that is explicitly defined, then the FFPT module 105 can interact with the project experience database 103 to determine a sequence of tasks and success or failure principles for each task based on the data representing the received project definition. An example of a process performed by the FFPT module 105 to determine a series of tasks for completing a project is described in more detail immediately below. Other examples of using an FFPT to determine a series of tasks for completing a project are set forth in FIG. 11 and its accompanying written description.

The project experience database 103 can be used to store data related to one or more projects previously experienced by the system 100. The stored data can include data representing: (i) historical tasks performed to complete previously experienced, or historical, projects, (ii) environmental conditions under which each of the historical tasks were performed, (iii) success principles and failure principles for each task, (iv) related experiences of successes and failures for each task, or (v) a combination thereof. The data stored by the project experience database 103 can include a mapping between features of historical project definition and one or more respective tasks. In some implementations, the data stored by the project experience database 103 can be indexed based on project terms or attributes, including predicted changes in the environment that enable the data stored by the project experience database 103 to be searched by the FFPT 105.

In some implementations, the project experience database 103 can store data related to only a subset of projects, tasks, environmental conditions, and related principles, for projects and tasks that were previously completed. For example, the project experience database 103 can store data related to projects and related principles, environmental conditions, and tasks that were successfully completed. However, in some implementations, the project experience database 103 can also store data related to projects, tasks, and related principles, for projects and tasks that were not successfully completed. For example, the project experience database 103 can store projects, tasks, environmental conditions, and related principles from projects and tasks that were successfully completed and projects and tasks that were not successfully completed.

In some implementations, projects that were successfully completed can be used to determine tasks to perform for a current, similar project in a similar environmental context by first identifying a historical project that satisfies a predetermined similarity threshold to a current project, and then determining the one or more tasks that were performed to successfully complete the one or more historical project. In some cases, projects that were not successfully completed can be used to determine tasks to not perform for a current, similar project and environmental context by identifying a historical project that satisfies a predetermined similarity threshold to a current project, and then determining the one or more tasks that were performed to not successfully complete the one or more related projects. That is, if performance of one or more historical tasks did not lead to completion of a particular historical project, then AIRS should not select the one or more historical tasks as part of a series of tasks for performing a current project that is similar to the particular historical project and context.

The FFPT module 105 can identify one or more historical projects stored within the project experience database 103 that are similar to the current project definition established by input 101 in a number of different ways. For example, the FFPT module 105 can extract keywords, attributes, or predicted changes in the environment included in the project definition of input 101 and generate a search query. The FFPT can execute the search query against the project experience database 103 to identify and obtain a set of one or more tasks corresponding to historical project definitions that satisfy the search parameters of the generated search query. A historical project definition may satisfy search parameters of the generated search query if, for example, the historical project definition includes terms, attributes, or predicted changes in the environment that match extracted keywords or attributes of the project definition of input 101.

However, there is not requirement that the search results in an exact matching of search parameters to historical project definitions. For example, in some implementations, historical project definitions may be represented as vectors in a vector space. In such implementations, the search query having one or more parameters of the project definition of input 101 can be vectorized, with each field of the vector corresponding to a word of a dictionary and each field having a corresponding weight that is indicative of the presence or absence of the term in the project definition of input 101. Each historical project definition may be similarity vectorized. In such implementations, the search vector can be compared to each of the historical project vector, and the matching historical project can be the historical project corresponding to a historical project vector that is determined to be nearest to the search vector in the vector space.

Once the matching historical project vector is identified, the data stored in the project experience database 103 including a sequence of one or more historical tasks for performing the similar historical project, environmental conditions under which the one or more historical tasks were performed, success and failure principles, or a combination thereof, that were indexed by the historical project definition can be obtained by the FFPT 105. The FFPT module 105 can then use the obtained one or more tasks as an initial sequence of tasks for performing the project defined by the input 101. For implementations where this historical project information also indexes tasks that were not successful in performing the historical task, the initial sequence of tasks may be a set of successful tasks used to complete the historical project that also omits one or more historical tasks that were deemed unsuccessful to complete the historical project.

Stage C shows the select next task in sequence 107 receiving the initial sequence of tasks from the feed-forward planning of tasks 105. The select next task in sequence 107 can, in some implementations, be combined with the feed-forward planning of tasks 105. The next task in sequence 107 selects a task from among the initial sequence of tasks received from the feed-forward planning of tasks 105 and sends the task along with corresponding goals related to the completion of the task to the PBP 111 as shown in item 108. At the initial execution of the select next task in sequence 107 at stage C for a particular project definition 101, the selected next task in sequence can include the first task in the sequence of tasks.

Stage D shows the PBP module 111 receiving a task from the select next task in sequence decision module 107. The task received is the next task to be executed in a sequence that is attempting to successfully complete the project. At the initial execution of the PBP module 111, the next task can include the first task in the sequence of tasks. The PBP module 111, which is described in more detail below, uses the task experience database 109 to choose one or more behaviors can be performed to complete the task received by the PBP module 111. For example, if a task involves dodging a moving obstacle, one possible behavior may be to select an evade behavior and instruct a system such as a robotics system, a sensory system, a navigation system, or a combination thereof, to perform the evade behavior to cause the corresponding movement of the evade behavior to occur. In this manner, the PBP modules 111 can initiate performance of one or more behaviors.

The PBP module 111 can also obtain and evaluate perception input related to the performance of one or more behaviors to assess how certain behaviors are impacting a situation or environment. For example, the PBP module 111 can use the goals associated with a task to assess the impact of one or more behaviors on an environment or within a situation. Based on the evaluation of the obtained perception input, the PBP module 111 can perform one or more additional behaviors. In the example of FIG. 1, the PBP module 111 can send assessment data to the evaluate task result module 113.

The evaluate task result module 113 can communicate with the perform PBP 111. For example, stage E shows that the evaluate task result module 113 can receive the assessment data related to a given behavior that the PBP selected, and initiated performance of, to complete a task. In some instances, the evaluate task result module 113 can determine, based on the assessment data and a success or failure principle, that the behavior selected and initiated by the PBP module 111 successfully completed the task. In such instances, the evaluate task module 113 can send a notification 115 to the evaluate project result module 116 that indicates that the task was successfully complete. Alternatively, in other instances, the evaluate task result module 113 can determine, based on the assessment data and a success or failure principle, that a different behavior is to be performed. This can occur, for example, if the evaluate task result module 113 determines that the selected and initiated behavior was unsuccessful in performing the task. In such instances, the evaluate task result module 113 can send data 114 back to the PBP module 111 that instructs the PBP module 111 that a new behavior is to be selected to perform the task. Responsive to receiving the data shown in item 114, the PBP module 111 can select, and initiate performance of, another behavior to perform the task. This feedback loop of selection and initiation of a behavior, performance of the behavior, providing of assessment data 112, evaluation of assessment data by the evaluate task result module 113, and instructing 114 the PBP to select and initiate a new behavior can iteratively continue until the evaluate task result module 113 determines, based on the assessment data, that the task has been performed successfully. At that point, a notification can be sent to the evaluate project result module 116 that the task has been performed successfully.

Stage F shows the evaluate project result module 116 receiving the notification from the evaluate task result module 113 indicating that the task was performed successfully using the most recent behavior that was selected, and initiated, by the PBP module 111. The evaluate project result 116 determines whether each task, of a sequence of tasks required to complete the project defined by original input 101, has been completed. In some instances, the evaluate project result 116 can determine that the project is not yet complete. In such instances, the evaluate project results module 116 can communicate data 117 back to the select next task in sequence module 107 that instructs the selected next task in sequence module 107 to select the next task, in the sequence of tasks, for input to the PBP module 111.

In some instances, the evaluate project result module 116 can determine that the sequence of tasks selected to complete the project defined by input 101 has failed. In such instances, the evaluate project results module 116 can communicate data back to the FFPT 105 that instructs the FFPT module 105 to select a different sequence of tasks that can be used to complete the project defined by the input 101. The FFPT module 105 can update project experience database 103 to indicate that the previously selected sequence of tasks is a set of tasks that does not successfully complete the project defined by input 101. The FFPT module 105 can then perform a modified search of the project experience database 103 to identifier a different sequence of tasks that can be used to complete the project defined by input 101. In some implementations, this can include adjusting a query that was used to search the project experience database 103 to identify similar historical projects. Adjusting the query can include adding or deleting one or more keywords from a query based on the project definition 101. Alternatively, adjusting the query can include modifying weights corresponding to terms in a search vector. The FFPT module 105 can then execute the adjusted search against the project experience database 103, obtain a different sequence of tasks, and then proceed to stage C to continue execution of the process flow of system 100 to complete the project defined by input 101.

In instances, the evaluate project result module 116 can output a notification 119 indicating that the project has been successfully completed. The evaluate project result module 116 can determine that the project has been successfully completed once each task of a sequence of tasks for completing the project defined by input 101 are completed. In such instances, the notification 119 can be provided as output 120.

At stage G, an output module 120 can receive the notification 119. The output module 120 can generate output data indicating that the system 100 has successfully performed the project. The output module 120 can provide such a notification 119 to another system or entity, such as a human, as a status update on the system 100 after a performance of a project. However, in some implementations, the output modules 120 can generate output indicating other determinations of the evaluate project result module 116. For example, system 100 can generate output data based on data 117 indicating that subsequent tasks are being requested to complete performance of the project described by input 101. By way of another example, system 100 can generate output data based on data 118 indicating that the previous sequence of tasks for completing the project defined by input data 101 has failed and that a new sequence of tasks is requested for completing the project.

Figure 2:
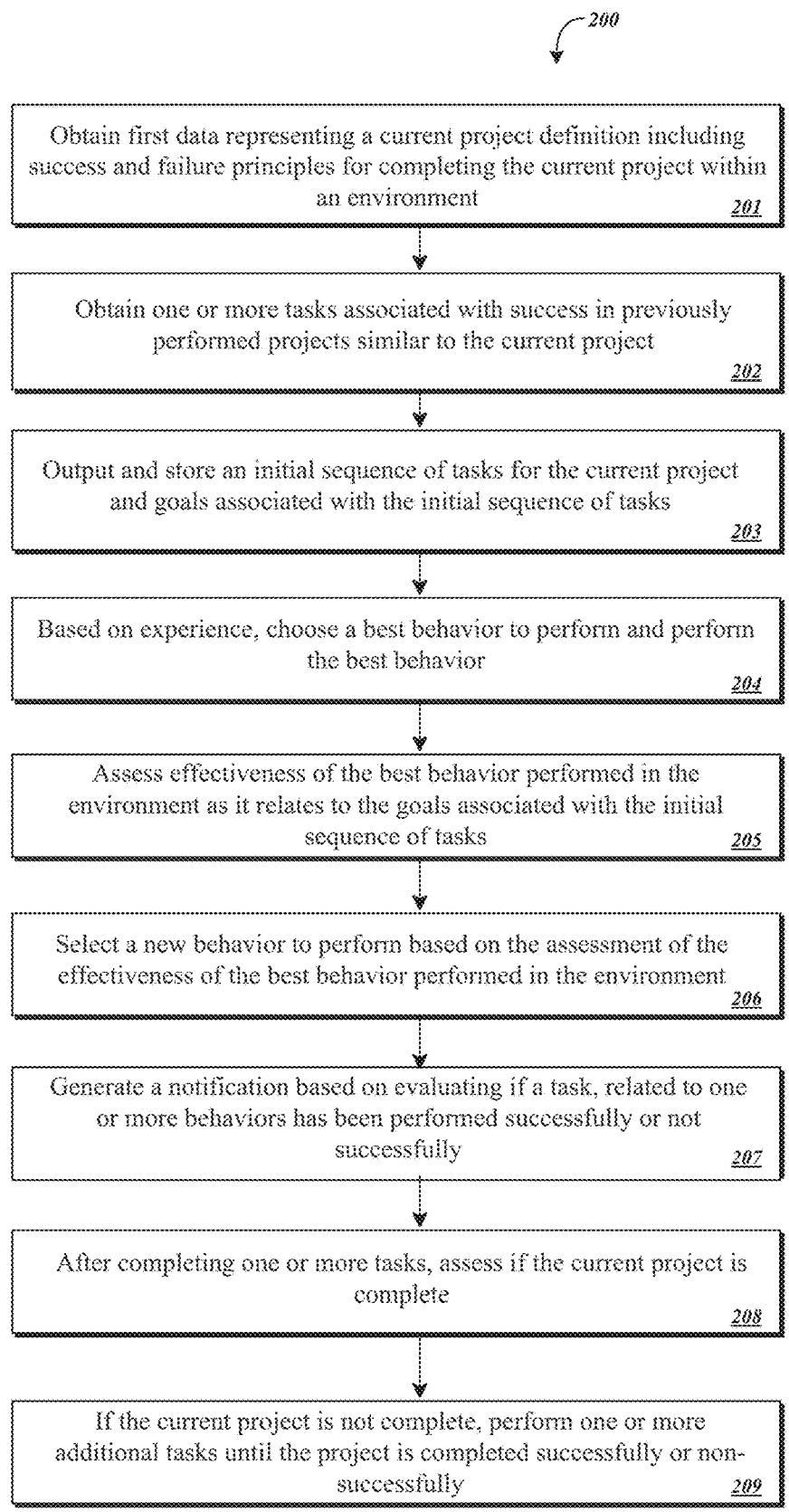
FIG. 2 is a flowchart of an example of a process for using an artificial intelligence reasoning system to perform a project.

FIG. 2 shows a flowchart of an example of a process 200 for performing a project by an artificial intelligence reasoning system (AIRS). For convenience, the process 200 will be described as being performed by a system such as the system 100 of FIG. 1.

The system can begin execution of the process 200 by obtaining first data representing a current project definition (201). In some implementations, the current project definition can include an explicit sequence of tasks. In other implementations, the current project definition can include general, natural language representation of the project to be performed such as evade collision with an incoming missile. In some implementations, the current project definition can include success and failure principles for completing the current project within an environment.

The system can continue execution of the process 200 by obtaining a sequence of one or more tasks that can be used to complete the project. In some implementations, the sequence of one or more tasks can be a sequence of tasks that have been used to successfully complete a historical project that is similar to the current project (202). For example, the FFTP 105 can use the project experience database 103 to identify similar projects and environmental conditions to the project defined by the input 101. The tasks, or tasks related to the tasks, that are stored with the similar projects and environmental conditions in the project experience 103 can be used to form a sequence of tasks composed of one or more tasks associated with a success of one or more similar projects stored within the project experience 103. This stage can be performed, for example, by the FFTP 105 module of system 100 of FIG. 1.

The system can continue execution of the process by outputting and storing an initial sequence of tasks for the current project and goals associated with the initial sequence of tasks (203). This stage can be performed, for example, by a system such as the select next task in sequence 107 in FIG. 1.

The system can continue execution of the process 200 by selecting a behavior to perform and initiating performance of the behavior (204). This stage can be performed, for example, by the PBP module 111 of system 100 of FIG. 1. The PBP module 111 can determine, based at least on the task experience 109, actions that can be performed to complete the task here referred to as behaviors.

The system can continue execution of the process 200 by assessing effectiveness of the behavior performed in the environment based on the goals associated with the initial sequence of tasks (205). This stage can be performed by the PBP module 111 of system 100 of FIG. 1 that can obtain and evaluate perception data associated with performed behaviors to assess the effectiveness of the performed behaviors. The evaluate task result module 113 of system 100 of FIG. 1, that in some cases is an element within the PBP 111, can further determine effectiveness of a given behavior as it relates to a given task and goals used to judge the effectiveness of the given task.

The system can continue execution of the process 200 by selecting a different behavior to perform a current task based on the assessment of the effectiveness of the best behavior performed in the environment (206). For example, the behavior can be performed non-successfully in which case a new behavior can be performed based on the current environment or situation assessment. By way of another example, in some implementations, a behavior that is performed successfully and results in a change of an environment of a situation can trigger, after assessment of the change in the environment of the situation, a new behavior to be performed.

The system can continue execution of the process 200 by generating a notification based on evaluating if a task, the performance of which was attempted by a behavior selected and initiated at stage 204, has been performed successfully or not successfully (207). For example, the evaluate task result module 113 of the system of FIG. 1 illustrates the process of evaluating a task result based on one or more performed behaviors.

The system can continue execution of the process 200 by, after completing one or more tasks, assessing if the current project is complete (208). For example, the evaluate project result module 116 of FIG. 1 shows where in the process of project completion the evaluation of a project result can occur.

The system can continue execution of the process 200 includes performing one or more additional tasks until the project is completed successfully or non-successfully, if the current project is not complete (209). For example, the evaluate project result module 116 of system 100 of FIG. 1 can communicate with other elements of the system 100 to determine additional tasks to perform. The evaluate project result 116 can also output a notification based on a given evaluation or status of a given project.

Figures 3A, 3B:
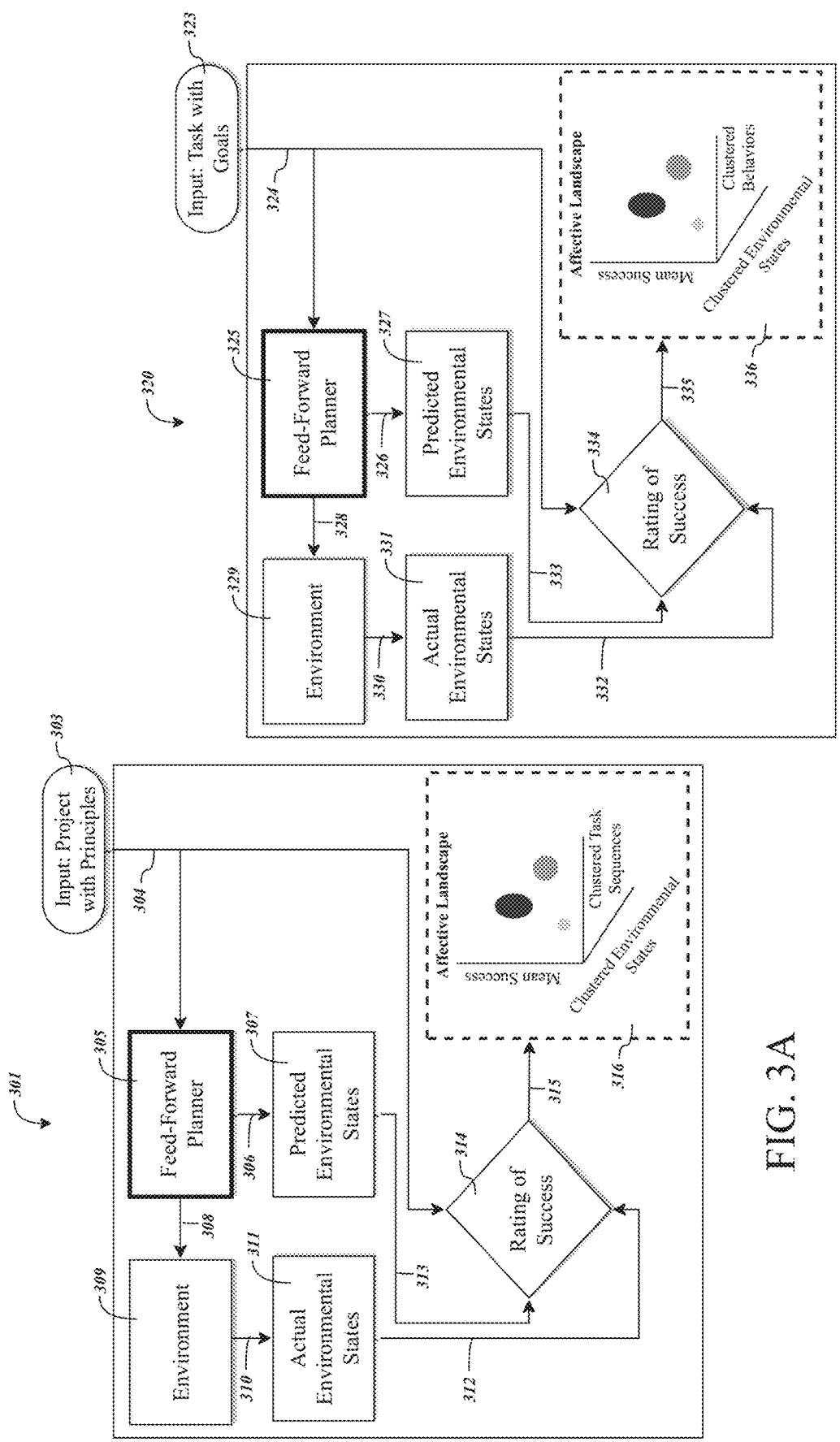
FIG. 3A is a diagram of an example of a system that can be used by an artificial intelligence reasoning system to train an affective landscape using actual environmental states.
FIG. 3B is a diagram of another example of a system that can be used by an artificial intelligence reasoning system to train a learned affective landscape using actual environmental states.

In the example shown in FIG. 1, the project experience 103 is used to inform generation of a sequence of tasks by the FFPT module 105. Similarly, the task experience 109 is used to inform generation of one or more behaviors by the PBP module 111. FIG. 3A and FIG. 3B are diagrams showing the process of learning experiences within an artificial intelligence reasoning system. Specifically, FIG. 3A shows the process of generating a data store such as the project experience 103 and FIG. 3B shows the process of generating a second data store such as the task experience 109.

FIG. 3A is a diagram of an example of a system 301 that can be used by an artificial intelligence reasoning system to train an affective landscape model using actual environmental states. In some implementations, the system 301 can be used to cluster environmental states with task sequences for storage in the project experience database 103. In some implementations, the affective landscape, once trained using the techniques described with reference to FIG. 3A or FIG. 3B below, can be employed as the learned affective landscape of FIG. 6 or 8.

The project experience system 301 can receive input 303 that contains a project definition with general success and failure principles. The input 303 can be similar to the input 101 of FIG. 1. As shown in item 304, the input 303 is sent to the feed-forward planner 305. Aspects of the feed-forward planner 305 are shown in FIG. 1 in reference to the FFTP module 105.

The feed-forward planner module 305 can determine a candidate task sequence. The candidate task sequence can include one or more tasks to be performed. The one or more tasks can include a sequence of one or more tasks selected to complete a project. The feed-forward planner module 305 can provide the one or more tasks as an input to the predicted environmental states module 307. In some implementations, the feed-forward planner 305 can determine a set of one or more tasks from the project definition 303 using techniques of the FFPT 105 described with reference to FIG. 1.

The predicted environmental state module 307 can generate a prediction of one or more possible future environmental states related to one or more of the tasks. The predicted environmental state can be a future environmental state that the system 301 expects to occur upon completion of the one or more tasks of the project defined at 303. In some implementations, the predicted environmental state 307 can be generated, by the predicted environmental states module 307, using one or more simulators to simulate performance of one or more behaviors to complete each of the one or more tasks. In such implementations, the predicted environmental states module 307 can determine one or more behaviors that can be used to be used to perform each of the one or more tasks in the simulated environment by filtering a behavior library to using a set of current environmental conditions that existed at, or near, the time of performance of the behavior to perform the task. The behavior library can be a database, or other form of data store, that stores data relating each of a plurality of behaviors known to the system 301 or previously performed by the system 301, with each behavior corresponding to an environment where the behavior can be performed or where the behavior was performed. In other implementations, the behavior library can be a machine learning model such as a neural network that has been trained to classify data representing a current environmental state into a set of one or more behaviors. In some implementations, the predicted environmental states module 307 can be an element within the feed-forward planer module 305. In some implementations, the predicted environmental states module 307 can be used to determine one or more tasks within a candidate task sequence.

The one or more tasks produced by the feed-forward planner module 305 also can be performed in a current environment. This is illustrated by the item 308, which can represent one or more tasks, being executed in a current environment 309 using one or more behaviors. The one or more behaviors that can be used to perform each of the one or more tasks in the current environment 309 that can be selected by filtering a behavior library using a set of current environmental conditions that define the current environment 309. The behavior library can be a database, or other form of data store, that stores data relating each of a plurality of behaviors known to the system 301 or previously performed by the system 301, with each behavior corresponding to an environment where the behavior can be performed or where the behavior was performed. In other implementations, the behavior library can be a machine learning model such as a neural network that has been trained to classify data representing a current environmental state into a set of one or more behaviors.

After completing one or more tasks, actual environmental states module 311 can obtain data describing an actual environmental state that shows actual changes to the current environment 309 as a result of performance of the one or more tasks in the current environment. For example, the actual environmental states module 311 can detect sensor data generated by one or more sensors that describes the actual environment. The system 301 can provide the sensor data 312 describing the actual environment output by the actual environmental states module 311, data 313 representing a predicted environmental state generated by the predicted environmental state 307, and initial input 303 that defines the initial project to be performed to a rating of success module 314.

The rating of success module 314 can be used to train the affective landscape module 316 using data 315 that is generated by the rating of success module 314 based on the rating of success module 314's processing of the data 312, 313, 303. For example, the rating of success module 314 can process data 312, 313, 303 to generate cluster of data in the affective landscape 316, as shown in item 316. The affective landscape 316 includes clusters of specific task sequences and corresponding environmental states together with a success measurement produced by the ratings of success module 314. The affective landscape can be used to inform future task sequence generation by correlating specific task sequences with high rates of success in specific environmental states. For example, a first sequence of tasks performed in a first environmental state to complete a first project that was successful can be performed again if similar environmental states and similar project criteria are received in a subsequent input detailing project and success and failure principles.

FIG. 3B is a diagram of another example of a system 320 that can be used by an artificial intelligence reasoning system to train a learned affective landscape using actual environmental states. In some implementations, the system 320 can be used to cluster environmental states with one or more behaviors for storage in the task experience database 109. In some implementations, the affective landscape, once trained using the techniques described with reference to FIG. 3A or FIG. 3B below, can be employed as the learned affective landscape of FIG. 6 or 8. By way of example, an affective landscape 336 trained using techniques of system 320 is trained to relate a behavior for a task, a historical environment for performing that task, and a success rate.

The task experience system 320 can receive input 323 that contains a project definition with general success and failure principles. The input 323 can be similar to the item 108 sent to the PBP 111 of FIG. 1. As shown in item 324, the input 323 is sent to the feed-forward planner module 325. Aspects of the feed-forward planner module 325 are shown in FIG. 1 in reference to the PBP 111.

The feed-forward planner module 325 determines a candidate behavior to be performed. In some implementations, the candidate behavior can be selected by filtering a behavior library using a set of current environmental conditions.

The predicted environmental state module 327 can be used to predict one or more future environmental states related to the candidate behavior. For example, the predicted environmental state can be a future environmental state that the system 320 expects to occur upon completion of the one or more tasks of the task defined at 323. In some implementations, the predicted environmental state generated by the predicted environmental state module 327 can be generated, by the predicted environmental state module 327 using one or more simulators to simulate performance of the candidate behavior to complete the task 323. In some instances, the predicted environmental states module 327 can be an element within the feed-forward planer module 325. In some cases, the predicted environmental states module 327 can be used to determine one or more tasks to be used as a candidate behavior.

The candidate behavior selected by the feed-forward planner module 325 can be used to perform the task 323 in the current environment. This is illustrated by the item 328, which can represent a behavior, being executed in current environment 329 to perform the task 323. After completing the candidate behavior, actual environmental states module 331 can obtain data describing an actual environmental state that shows actual changes to the current environment 329 based on the candidate behavior being performed. For example, the actual environmental states module 331 can detect sensor data generated by one or more sensors that describes the actual environment. The system 320 can provide the sensor data 332 describing the actual environment output by the actual environmental states module 331, data 333 representing the predicted environmental states predicted by the predicted environmental states module 327, and data 323 describing the task to a rating of success module 334.

The rating of success module 334 can be used to train the affective landscape module 336 using data 335 that is generated by the rating of success module 334 based on the rating of success module 334's processing of the 332, 333, 323. For example, the rating of success module 314 can process data 332, 333, 323 to generate clusters of data in the affective landscape 336, as shown in item 336. The affective landscape 336 includes clusters specific behaviors and corresponding environmental states together with a success measurement produced by the ratings of success module 314. The affective landscape 336 can be used to inform future candidate behavior generation by correlating specific behaviors with high rates of success in specific environmental states. For example, a first behavior performed in a first environmental state to complete a first project that was successful can be performed again if similar environmental states and similar task definition and goals are received in a subsequent input detailing a task and success and failure goals.

Figure 4:
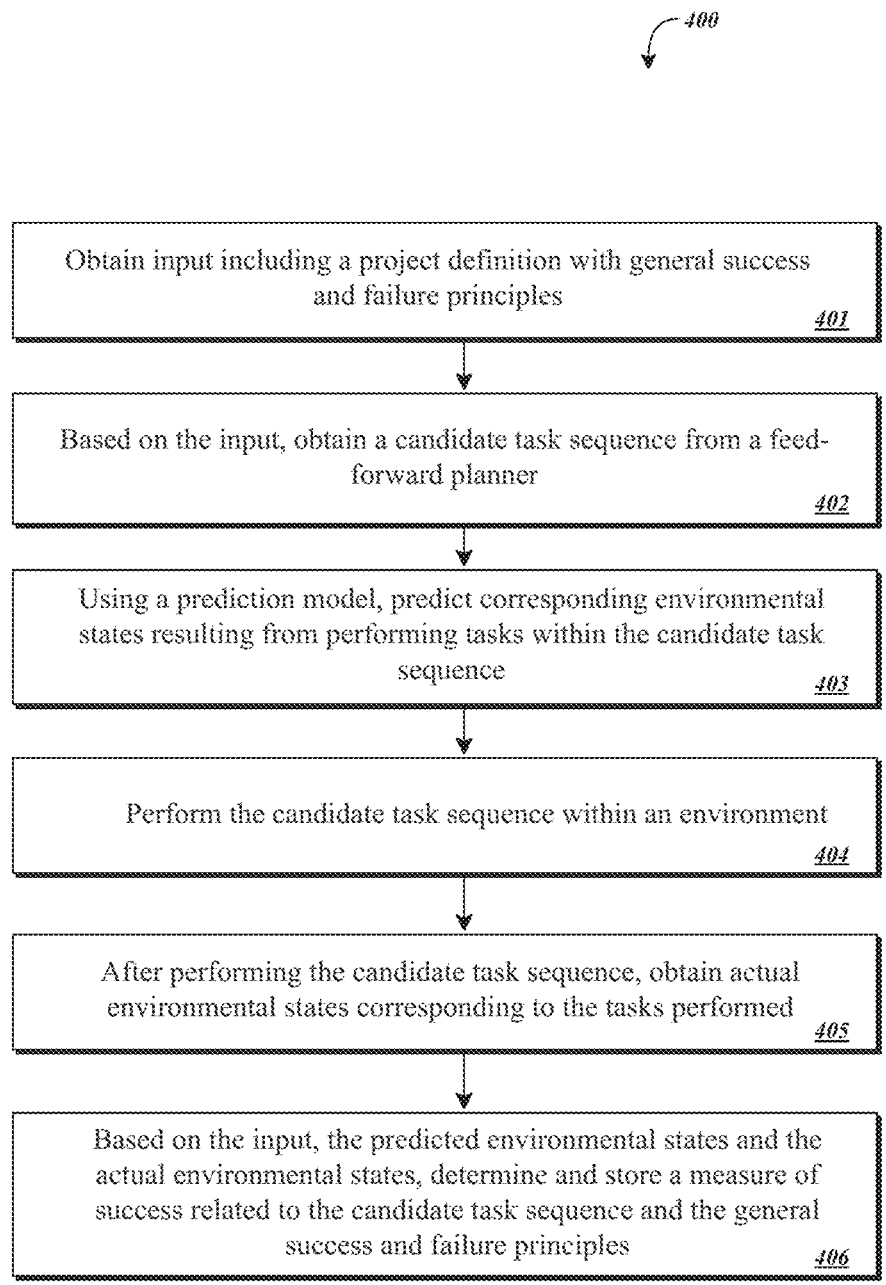
FIG. 4 is a flowchart of an example of a process for learning project experiences by an artificial intelligence reasoning system.

FIG. 4 is a flowchart of an example of a process 400 for learning project experiences by an artificial intelligence reasoning system. The process 400 can be performed by one or more electronic devices or system such as the system 301 of FIG. 3A.

The process 400 includes, obtaining input including a project definition with general success and failure principles (401). For example, the project experience system 301 receives input 303 that contains a project definition with general success and failure principles. The input 303 can be similar to the input 101 of FIG. 1.

The process 400 includes, based on the input, obtaining a candidate task sequence from a feed-forward planner (402). For example, the feed-forward planner 305 determines a candidate task sequence where the candidate task sequence is composed of one or more tasks to be performed.

The process 400 includes, predicting, using a prediction model, corresponding environmental states resulting from performing tasks within the candidate task sequence (403). For example, predicted environmental state 307 illustrates one or more possible environmental states related to one or more of the tasks. In some instances, the predicted environmental states 307 can be an element within the feed-forward planer 305. In some cases, the predicted environmental states 307 can be used to determine one or more tasks within a candidate task sequence.

The process 400 includes, performing the candidate task sequence within an environment (404). For example, the feed-forward planner 305 can also send the candidate task sequence to be performed in an environment. The item 308 directed into item 309 illustrates the candidate task sequence being performed in an environment.

The process 400 includes, after performing the candidate task sequence, obtaining actual environmental states corresponding to the tasks performed (405). For example, after completing one or more tasks, actual environmental states 311 can be obtained that show changes to the environment based on the one or more tasks within the candidate task sequence being performed.

The process 400 includes, based on the input, the predicted environmental states and the actual environmental states, determine and store a measure of success related to the candidate task sequence and the general success and failure principles (406). For example, in FIG. 3A, the actual environmental states 311 are sent along with the predicted environmental states 307 to a rating of success 314 as shown in item 312 and 313, respectively. The rating of success 314 also receives the initial input 303 detailing the project and general principles related to success and failure of the project. The rating of success 314 processes and clusters the data received in an affective landscape as shown in item 316. The affective landscape 316 clusters specific task sequences and corresponding environmental states together with a success measurement. The affective landscape can be used to inform future task sequence generation by correlating specific task sequences with high rates of success in specific environmental states. For example, a first sequence of tasks performed in a first environmental state to complete a first project that was successful can be performed again if similar environmental states and similar project criteria are received in a subsequent input detailing project and success and failure principles.

Figure 5:
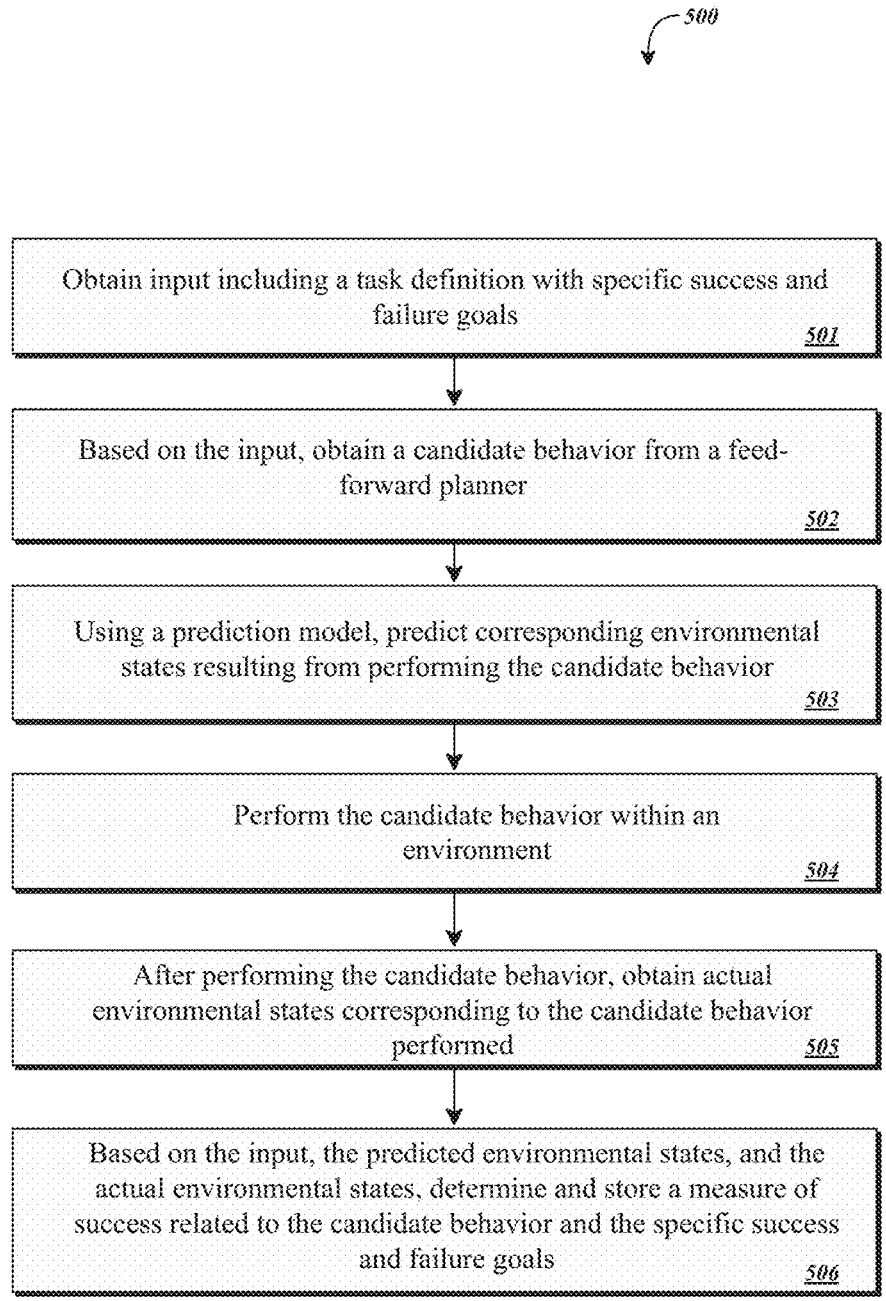
FIG. 5 is a flowchart of an example of a process for learning behavior experiences by an artificial intelligence reasoning system.

FIG. 5 is a flowchart of an example of a process 500 for learning behavior experiences by an artificial intelligence reasoning system. The process 500 can be performed by electronic devices or system such as the system 320 of FIG. 3B.

The process 500 includes, obtaining input including a project definition with general success and failure principles (501). For example, the task experience system 321 receives input 323 that contains a task definition with specific success and failure goals. The input 323 can be similar to the item 108 sent to the PBP 111 of FIG. 1.

The process 500 includes, based on the input, obtaining a candidate behavior from a feed-forward planner (502). For example, the feed-forward planner 325 determines a candidate behavior based on a likelihood that the behavior is related to successful completion of tasks based on the task and environmental data.

The process 500 includes, predicting, using a prediction model, corresponding environmental states resulting from performing the candidate behavior (503). For example, predicted environmental state 327 illustrates one or more possible environmental states related to the candidate behavior. In some instances, the predicted environmental states 327 can be an element within the feed-forward planer 325. In some cases, the predicted environmental states 327 can be used to determine one or more behaviors.

The process 500 includes, performing the candidate behavior within an environment (504). For example, the feed-forward planner 325 can also send the candidate behavior to be performed in an environment. The item 328 directed into item 329 illustrates the candidate behavior being performed in an environment.

The process 500 includes, after performing the candidate behavior, obtaining actual environmental states corresponding to the candidate behavior performed (505). For example, after completing the candidate behavior, actual environmental states 331 can be obtained that show changes to the environment based on the candidate behavior being performed.

The process 500 includes, based on the input, the predicted environmental states and the actual environmental states, determine and store a measure of success related to the candidate behavior and the specific success and failure goals (506). For example, in FIG. 3B, the actual environmental states 331 are sent along with the predicted environmental states 327 to a rating of success 334 as shown in item 332 and 333, respectively. The rating of success 334 also receives the initial input 323 detailing the task and specific goals related to success and failure of the task. The rating of success 334 processes and clusters the data received in an affective landscape as shown in item 336. The affective landscape 336 clusters specific behaviors and corresponding environmental states together with a success measurement. The affective landscape can be used to inform future behavior generation by correlating specific behaviors with high rates of success in specific environmental states. For example, a first behavior performed in a first environmental state to complete a first project that was successful can be performed again if similar environmental states and similar project criteria are received in a subsequent input detailing tasks and success and failure goals.

Figure 6:
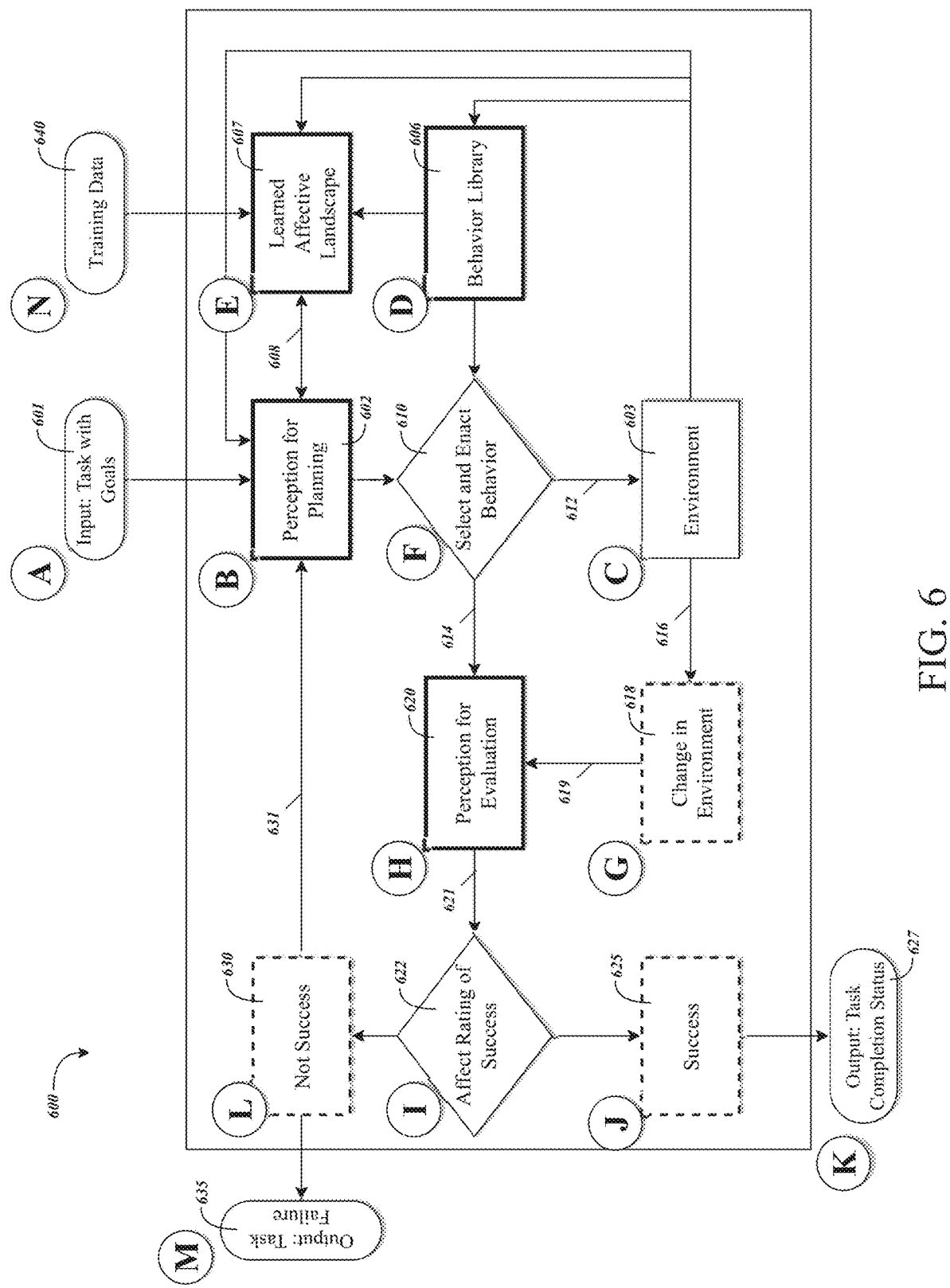
FIG. 6 is a diagram of an example of a training system used to train a subsystem of an artificial intelligence reasoning system to select and enact a behavior for performance in a particular environment.

In FIG. 1, the PBP 111 receives a task and corresponding goals from the feed-forward planning of tasks 105. The PBP 111 then performs one or more behaviors to complete the received task. In FIG. 6, the PBP 111 is shown in more detail.

FIG. 6 is a diagram of an example of a training system 600 used to train a subsystem of an artificial intelligence reasoning system to select and enact a behavior for performance in a particular environment. The system 600 is similar to the PBP 111 of FIG. 1. However, the system 600 describes such functionality in greater detail. The system 600 includes an environment module 603, a perception for planning module 602, behavior library module 606, learned affective landscape module 607, and perception for evaluation module 620.

In some implementations, the environment module 603 can represent an input unit that has an application programming interface (API) configured to receive sensor data generated by one or more sensors in real time. The sensor data can include one or more sensed attributes of a current environment generated by the one or more sensors. In some implementations, the received sensor data can be provided as inputs to the modules 602, 606, 607, 620 and enable the respective modules 602, 606, 607, 620 to process data representing sensed attributes of the current environment that are generated in real-time. In some implementations, the one or more sensors can be mounted to an agent system that is configured to receive instructions from the system 600 regarding selection of a particular behavior and triggering of performance of the behavior. In other implementations, the environment module 602 can include the one or more sensors themselves as part of system 600. During runtime, as described with reference to, e.g., FIGS. 8 and 9, sensor data can be actual sensor data that is generated by the physical sensors. However, during training, as described with reference to FIGS. 6 and 7, such sensor data may, in some implementations, be generated and provided by one or more simulators that are configured to train the system 100 based a variety of different environmental conditions.

In either implementation, the one or more sensors can include one or more light sensors, one or more temperature sensors, one or more infrared sensors, one or more LIDAR sensors, one or more gyroscopes, one or more accelerometers, one or more contact sensors, or magnetometers, one or more humidity sensors, one or more sound pressure level sensors, one or more atmospheric pressure sensors, one or more infrared light sensors, one or more electromagnetic radiation sensors, other environmental sensors, or any combination thereof.

In some implementations, each of the modules 602, 606, 607, 620 can be implemented using machine learning models such as one or more neural networks. In such implementations, each of these neural networks of the system 600 can collaborate with one another in order to select and initiate performance of a behavior that can be used to implement a task. In the example of system 600 depicted in FIG. 6, decisions based on one or more output data items from the modules 602, 606, 607, 620 are illustrated with diamond shapes such as the select and enact behavior module 610 and affect rating of success module 622. Some elements of FIG. 6 that are depicted as rectangles with dashed borders can represent an update in obtained sensor data such as the change in environment block 618. Other elements that are depicted as rectangles with dashed borders can represent the output of a decision module that is graphically depicted for ease of understanding the underlying process and subsequent stages such as success block 625 and not success block 630.

Though modules 602, 606, 607, and 620 can include machine learning models such as one or more neural networks, the present disclosure need not be so limited. For example, in some implementations, the learned affective landscape can be implemented using collaborative filtering. By way of another example, the behavior library 606 can include a database of records indicating a list of behaviors that have been used to perform a task in a particular environment. In some implementations, this list of behaviors can include a list of behaviors that have been performed to successfully complete a task. In other implementations, the list of behaviors can include all behaviors that have been selected and initiated by the system 600 including behaviors that have been successful in completing a task in a particular environment and behaviors that have not been successful in completing a task in a particular environment. Accordingly, implementations of the present disclosure can be employed that implement one or more of the modules 602, 606, 607, 620 in manner that achieves their described functionality without the using a machine learning model such as a neural network for each module.

The process of training the system 600 is described with reference to FIG. 6 as proceeding from stage A to stage N. Stage A shows input 601 being received by the system 600. The input 601 is sent to the perception for planning module, which in this implementation, may be implemented using a neural network 602. The input 601 can include data describing a definition of a particular task to perform. In some implementations, the definition of the particular task can include data describing one or more goals related to success or failure modes of performance of the particular task.

Stage B shows the perception for planning neural network 602 receiving the input 601. The perception for planning neural network 602 is configured to receive one or more types of input data describing sensed attributes of a current environment. In some instances, data describing sensed attributes of the environment can be obtained from one or more sensors on an agent system that is carrying out one or more tasks or behaviors related to completing a project. In other cases, data from the environment can be obtained from another device. In yet other implementations, the one or more sensors may be part of the system 600. The one or more types of input data related to a current environment can be forms of visual data, audio data, tactical data, odors, or other forms of sensory data related to an environment. Stage C shows sensor data from the environment module 603 can be provided as an input to not only the perception for planning neural network 602—but also the behavior library 606 and the learned affective landscape 607. As discussed above, the environment module 603 can be an API that is configured to interface, in real time, with one or more sensors in a manner that enables the environment module 603 to receive sensed attributes describing features of a current environment in a vicinity of an agent that is performing one or more tasks related to a project.

Stage D shows data from the environment module 603 being received at the behavior library 606. In some implementations, the behavior library 606 can include a list of behaviors that have been used to perform a task in a particular environment. In some implementations, this list of behaviors can include a list of behaviors that have been performed to successfully complete a task. In some implementations, the list of behaviors can be indexed by the behavior's predicted changes in the environment. However, other implementations include a different list of behaviors. For example, in other implementations, the list of behaviors can include all behaviors that have been selected and initiated by the system 600 including behaviors that have been successful in completing a task in a particular environment and behaviors that have not been successful in completing a task in a particular environment. Like the prior example, this list of behaviors in this example can also be indexed by the behavior's predicted changes in the environment.

In some implementations, the behavior library 606 can be implemented using a database without any machine learning techniques. In such implementations, the behavior library 606 can be configured to query or filter database entries based on received sensor data from the environment module 603. In other implementations, the behavior library 606 can be implemented using one or more machine learning modules such as a neural networks. In such implementations, the received sensor data from the environment module 603 can be vectorized and provided as an input environment vector to the neural network that has been trained to identify a class of behaviors that were selected and initiated in an environment that matches the input environment vector within a predetermined similarity method.

The behavior library 606 can communicate with the learned affective landscape 607. As shown in stage E, the learned affective landscape module 607, also referred to as an affective experience module, can store data that relates: (i) behaviors for performing a task, (ii) historical environment data, and (iii) a success rate for the behavior successfully completing the task within the environment. In some implementations, this can include the learned affective landscape 607 storing one or more tasks or behaviors taken at a given time, associating the one or more tasks or behaviors taken at the given time with environmental data obtained also at that time, and then storing the result of performing one or more tasks or behaviors, in particular, whether or not performing the one or more tasks was successful. In this way, the learned affective landscape 607 can define likely successful tasks, behaviors, or actions based on a given task of project to complete and environmental data obtained at a given time.

The learned affective landscape module 607 can function like a human brain's emotional component to select a single behavior from each of plurality of behaviors stored by the behavior library 606. In this example, the behavior library 606 can function like a human brain's long term memory, thereby creating a record of each of the behaviors the system 600 have selected and initiated for tasks in a particular historical environment. The learned affective landscape module 607 can achieve this functionality using one or more neural networks as outline below. Though an example of this functionality is described using one or more neural networks, the functionality of the learned affective landscape module 607 can also be achieved using non-machine learning techniques such as collaborative filtering techniques.

In one implementation, the affective landscape module 607 can be trained using, for example, the system shown in FIG. 3B, to generating output data representing a behavior that is to be performed for a particular task. In some implementations, the behavior represented by the output data can be a behavior that is likely to be the most successful behavior for performing the task. The behavior can be determined to be "most likely successful" because one factor processed by the neural network is the historical success rate for the behavior in historical environments corresponding to the current environment.

Accordingly, the learned affective landscape 607 can be a form of filtering. For example, the learned affective landscape 607 can select a particular behavior from the behavior library as an input to the perception for planning module 602 based, at least in part, on real-time sensor data that describes the current environment, which is obtained from the environment module 603. In some implementations, this can be achieved using a collaborative filtering. In other implementations, this can be achieved using a neural network that has been trained to generate output data representing a particular behavior that can be used to perform a task in a particular environment based on the neural network processing input data that includes (i) first data representing real-time sensor data describing sensed attributes of the current environment, (ii) second data representing a target end state for the task, and (iii) third data representing one or more inputs from a behavior library indicating a level of success of historical behaviors performed in historical environments that were similar to the current environment defined by the real-time sensor data. In some implementations, the third data can include alternatively include historical data representing successes and failures of a particular task sequence or behavior when the task sequence or behavior was performed in a historical environment that corresponds to the current environmental state.

The historical data input into the affective landscape model be filtered from the behavioral library based on the sensor data received by the behavioral library that described the current environmental state. That is, for the affective landscape module 607 need not process behavior data corresponding to behaviors performed in different environments. In some implementations, the output generated by the learned affective landscape module 607 can represent a most successful behavior that can be used to complete the task for the current environment. In other implementations, the output of the learned affective landscape module 607 can include multiple candidate behaviors for the current environment defined by the sensor data.

Item 608 shows communication between the perception for planning neural network 602 and the learned affective landscape 607. For example, the perception for planning neural network 602 can obtain output data generated by the learned affective landscape 607 that represents one or more candidate behaviors for completing the task defined by 601. Thus, in one implementation, the perception for planning neural network 602 can be trained to generate output data representing a particular behavior selected by the perception for planning module 602 based on the perception for planning module processing input data that includes a task definition 601, sensor data describing the current environment from the current environment module 603, and output data generated by the learned affective landscape module 607. In the short term, the perception for planning module 602 may generate output data representing a particular behavior that skews towards the behavior recommended by the output data generated by the learned affective landscape module 607. However, over time, the perception for planning module 602 can be retrained based on feedback 631 that allows the perception for planning module 602 to make improved behavior selections over time. Thus, while the learned affective landscape 607 provides a behavior selection recommendation that is similar to an emotional human response in that it is correlated based on historical success rates, the system 600 can learn to refine those behavior selections over time based on learned feedback 631. Accordingly, much like a human brain can learn based on a person's experiences, the system 600 can use the feedback loop that feeds into the perception for planning module 602 to make improved behavior selection inferences over time.

In stage F, a output data, which is generated by the perception for planning neural network 602, represents a particular behavior, and is informed by the learned affective landscape 607 can be selected, by the select and enact behavior module 610, for performance to complete the topic specified by the task goals. The select and enact behavior module 610 can generate a predicted environmental state after performance of the behavior represented by the output data generated by the perception for planning module 610. For example, the select and enact behavior module 610 can simulate an expected change of the current environment based on performance of the behavior represented by the output data and use the results of the simulation as a predicted environment. In some implementations, the select and enact behavior module 610 can include a machine learning model such as one or more neural networks that have been trained to generate data representing a predicted environmental state by processing data representing an actual environmental state, a behavior, and one or more tasks. In some implementations, such a machine learning model can be iteratively trained by using a simulator to input data representing an actual environmental condition, a selected behavior, and a task that is to be performed by the behavior. Then, the parameters of the machine learning model can be adjusted based on the data representing a predicted environmental state output by the model. For example, if the predicted environmental state output by the machine learning model during training does not match the environment expected of the data input to the machine learning model within a predetermined level of similarity, then the model can be penalized to discourage such predictions. Alternatively, if the environmental state output by the machine learning model during training matches the environment expected of the data input to the machine learning model within a predetermined level of similarity, then the model can be rewarded to encourage the model to make such predictions.

The select and enact behavior module 610 can provide data representing the predicted environmental state as an input to the perception for evaluation neural network 620 as shown in item 614. The select and enact behavior module 610 can further enact the behavior within the environment 603 as shown in item 612. Once the selected behavior is performed in the current environment, the environment module 603 can obtain sensors data 618 generated by the one or more sensors that results in a change or changes in the current environment Stage G shows a data element containing a change in the environment 618. The data element 618 is shown for visualization purposes. The data element 618 is a result of the behavior from the perception for planning neural network 602 being enacted, for example, by an agent system, within the current environment. For example, an agent carrying out the behavior within an environment may adjust its position in the environment. The change in position can result in a change in the sensed attributes measured by one or more sensors monitoring the environment. This change in environment, represented by sensor data generated by one or more sensors, can be provided as input 619 to the perception for evaluation module 620. In some implementations, multiple, simultaneous changes in the environment from one enacted behavior are possible.

Stage H shows the perception for evaluation module 620 receiving both the predicted environmental state 614 generated by the select and enact behavior module 610 and the sensor data representing the change in environment 619. The perception for evaluation module 620 is configured to process the predicted environmental state 614 based on enactment of the behavior 612 and the sensor data representing the actual environmental state after enactment of the behavior 612 in order to determine a difference value between the predicted environmental state 614 and the actual environmental state 619. In some implementations, the perception for evaluation 620 is a neural network that is trained to generate output data the represents level of similarity between the predicted environment state 614 and the actual environment state 619. In other implementations, the perception for evaluation module 620 can include a vector similarity unit. In such implementations, the predicted environmental state 614 and actual environmental state 619 can be vectorized. Then, the vector similarity unit can determine a level of similarity between the two vectors. In such implementations, the distance between vectors in a vector space an provide an indication in the similarity between the predicted environment and the actual environment, with vectors having a smaller distance between them indicating respective environments are more similar with larger distances between vectors indicating respective environments that are more different.

In some implementations, processes involving calculating and obtaining the changes in environment 618 is performed within the perception for evaluation 620. The difference value can be a form of multi-dimensional vector comparing one data set representing a predicted environmental state with another data set representing an actual perceived environmental state. In some implementations, the difference value can be used to train elements of the system 600 including the perception for planning neural network 602 to better predict environmental states.

In some implementations, the difference value is evaluated using a threshold, to determine if re-evaluation of the behavior is needed. In other implementations, affective experience related to the difference value is stored, relating historical experience of success and failure to different levels of the difference value. In all instances, high levels of the difference value constitute surprise to the artificial intelligence reasoning system, and result in higher levels of activation and re-planning than lower levels of the difference value.

Stage I shows a decision model that configured to evaluate the output from the perception for evaluation module 620. The affect rating of success module 622 shows a visualization of the process of determining either a success 625 or not a success 630. In some implementations, affect rating of success module 622 can indicate that the completion of the task using the enacted behavior 612 was a success 625 if the predicted environmental state 614 satisfies a predetermined level of similarity to the actual environmental state 619. Alternatively, if the affect ration of success module 625 can indicate that the completion of the task using the enacted behavior 612 was not a success 630 if the predicted environmental state 614 does not satisfy a predetermined level of similarity to the actual environmental state 619.

Stage J shows the success 625 branch of the affect rating of success module 622. The success 625 branch can be executed if the success criteria for the goal related to the task of the input 601 is met. By way of example, if the goal and criteria are met by based on an evaluation of the perceived changes in the environment, the using the enacted behavior to complete the task was a success. The perceived changes in the environment can include the difference between the predicted environmental state and the actual environmental state.

Stage K shows the output 627 containing information of the success. In some implementations, during the training stage, elements of the system 600, including the perception for planning neural network 602 can use data related to the output 627 to improve aspects of its neural network. For example, in some implementations, the output 627 can be used to further train the learned affective landscape 607.

Stage L shows the not success 630 branch of the affect rating of success module 622. By way of example, if the goal and criteria are not met by based on an evaluation of the perceived changes in the environment, then using the enacted behavior to complete the task was not a success. If the task is not a success, as determined based on an evaluation of the predicted environmental state 614 and the actual environmental state 619, then fail criteria 631 related to the given task can be communicated back to the perception for planning neural network 602. In some implementations, specific environment data related to the given task as well as behaviors performed can be included in the feedback 631.

Stage M shows output related to a failure 635 as determined in FIG. 6 in the affect rating of success module 622. In some implementations, elements of the system 600, including the perception for planning neural network 602 or the learned affective landscape 607 can use data related to the output related to a failure 635 to improve aspects of their neural networks. For example data related to the failure such as fail criteria 631 related to a given task can be provided back to the perception for planning neural network 602 and used to train the network 602 to, for example, penalize the perception for planning neural network 602 for using selecting the enacted behavior 612, which failed in this instance, for use in attempting to complete the task. Penalizing the perception for planning neural network 602 can include, for example, adjusting one or more weights or parameters of the perception for planning neural network 602 in a manner that reduces the likelihood that the perception for planning neural network 602 would select the same behavior for the same task in the future.

In some implementations, data from the output 627, the output related to a failure 635, as well as data from the environment 603 can be used to train elements of the system 600. For example, as shown in FIG. 6, data from the output 627, the output related to a failure 635, as well as data from the environment 603 are used in Stage N as training data 640. The training data 640 is sent to the system 600 for training one or more of the neural networks of the system 600. In the example of FIG. 6, the training data 640 is received by the learned affective landscape 607. In some implementations, the learned affective landscape 607 processes the training data 640 by grouping or associating aspects of the training data 640 including elements of data from the output 627, the output related to a failure 635, as well as data from the environment 603. The affective landscape 607 can use the processed groupings or associations to improve the behavior to environmental data to success measurement association used to determine one or more behaviors to perform based on a task, specified goals of success or failure, as well as current environmental data.

Figure 7:
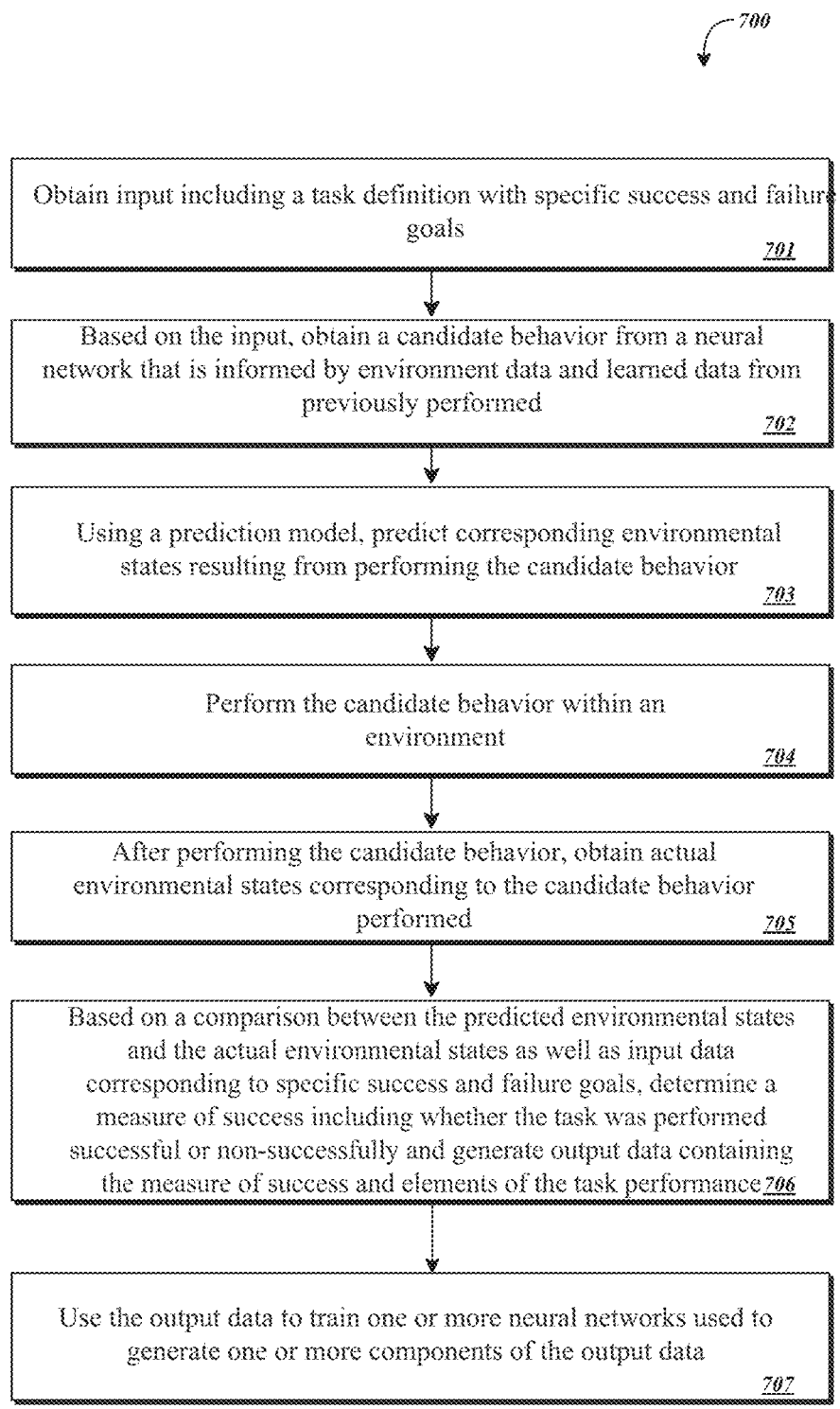
FIG. 7 is a flowchart of an example of a process for training a subsystem of an artificial intelligence reasoning system to select and enact a behavior for performance in a particular environment.

FIG. 7 is a flowchart of an example process 700 for training a subsystem of an artificial intelligence reasoning system to select and enact a behavior for performance in a particular environment.

The process 700 can be performed by one or more computer elements such as the system 600 of FIG. 6.

The process 700 includes obtaining input including a task definition with specific success and failure goals (701). For example, the input 601 can be used as input to the system 600 of FIG. 6.

The process 700 includes, based on the input, obtaining a candidate behavior from a neural network that is informed by current environment data and learned data from previously performed tasks (702). For example, the learned affective landscape 607 of FIG. 6 can be used to inform the choice of a candidate behavior. By associating behaviors with environment and measurements of success, the learned affective landscape 607 enables subsequent informed selection on behavior. The learned affective landscape 607 tends to aid in choosing behaviors that result in successful task completions based on environment data as well as success or failure goals.

The process 700 includes predicting, by using a prediction model, corresponding environmental states resulting from performing the candidate behavior (703). For example, the perception for planning neural network 602 can predict a subsequent environmental state based on the predicted effect of performing a given behavior. The perception for planning neural network 602 represents another neural network that can be trained based on processed data.

In some implementations, a perception for planning neural network is trained before runtime. For example, one or more training data sets are inputted into the perception for planning neural network 602 to obtain a trained neural network. The trained neural network can then be used at runtime for operations such as predicting environmental states based on predicted effects of performing a behavior in an environment.

In some implementations, a perception for planning neural network is trained during runtime. For example, the perception for planning neural network 602 can receive updates based on feedback. Aspects of a feedback loop are discussed later in this specification.

The process 700 includes performing the candidate behavior within an environment (704). For example, as shown in FIG. 6, the perception for planning neural network 602 provides a candidate behavior that is then performed in the environment 603.

The process 700 includes, after performing the candidate behavior, obtaining actual environmental states corresponding to the candidate behavior performed (705). For example, as shown in FIG. 6, the change in environment 618 data element derived from the environment is a representation of one or more pieces of data gathered from the environment 603 in response to a behavior being performed in the environment 603. The pieces of data can be obtained by sensors affixed to an agent performing one or more of the behaviors within the environment 603 or by one or more other elements connected to a system such as the system 600 that can detect, record, and transfer perceptual data types (e.g., visual data, audio data, etc.).

The process 700 includes, based on a comparison between the predicted environmental states and the actual environmental states as well as input data corresponding to specific success and failure goals, determine a measure of success including whether the task was performed successful or non-successfully and generate output data containing the measure of success and elements of the task performance (706). For example, in FIG. 6, the perception for evaluation 620 illustrates the process of assessing a difference between a predicted change of an environmental state related to the environment 603 determined by the perception for planning neural network 602 and an actual change of an environmental state related to the environment 603 obtained from sensors or other data resources with access to the environment 603.

The process 700 includes, using the output data to train one or more neural networks used to generate one or more components of the output data (707). For example, in FIG. 6 the difference determined by the perception for evaluation 620 is used to determine if a behavior results in a success or not a success. This output data can be sent back to elements such as the perception for planning neural network 602 to improve elements of operation such as elements of predicting environmental state changes based on behavior performances.

In some implementations, output data from a system is used to train aspects of the system. For example, outcomes that are failure, success, or partial runs that do not result in a success or failure, can be saved and used to train elements of the system such as the system 600 in FIG. 6. In some cases, the output data is used to train a learned affective landscape such as the learned affective landscape 607. The learned affective landscape 607 added to or changed to correlate behaviors or tasks differently with different environment data or measures of success. In some cases, training data to the learned affective landscape 607 simply involves adding sets of data based on runs of the system 600 into the database from which the learned affective landscape 607 can operate.

Figure 8:
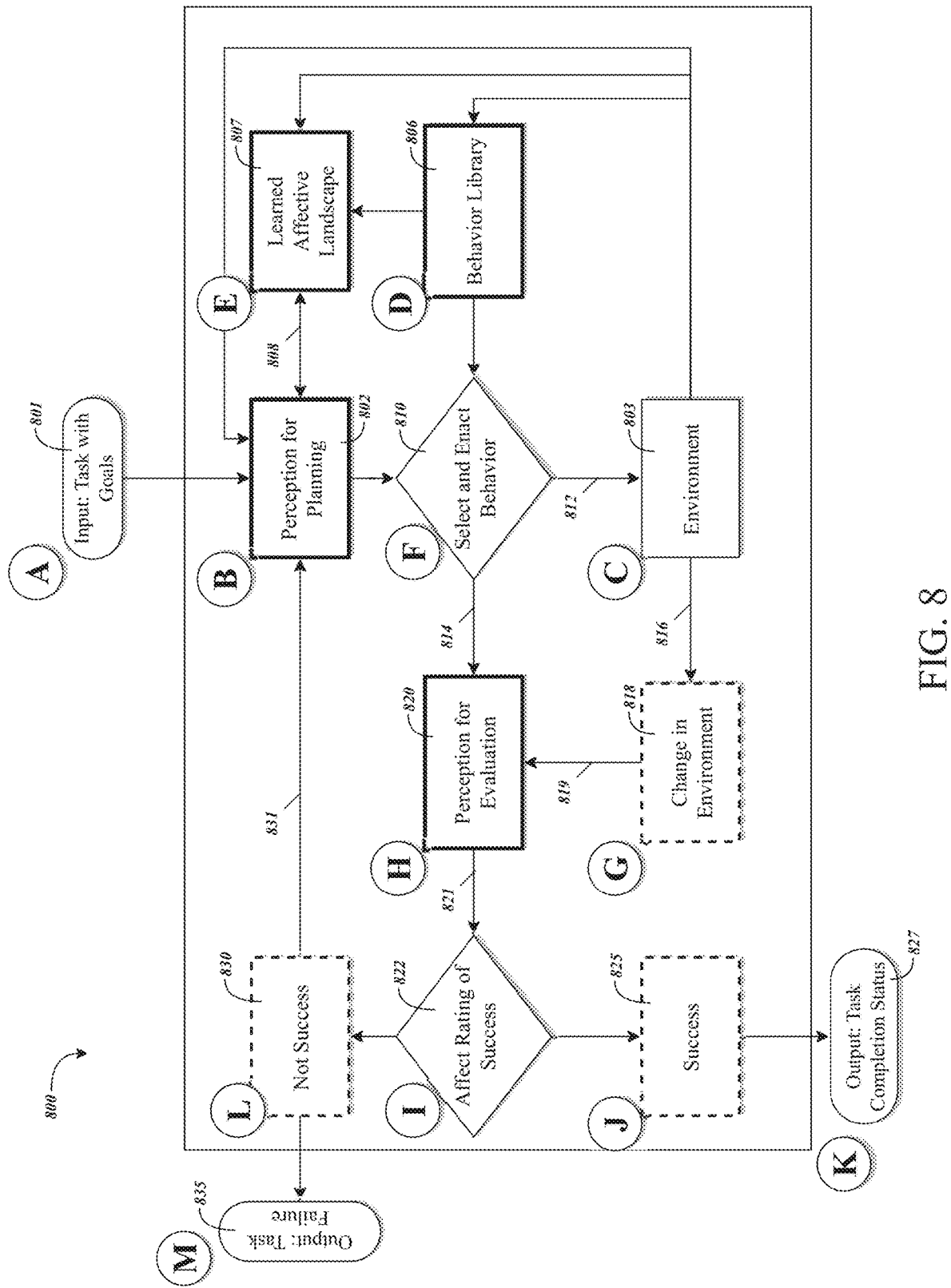
FIG. 8 is a diagram of an example of a runtime subsystem of an artificial intelligence reasoning system that is trained to select and enact a behavior for performance in a particular environment.

In FIG. 1, the PBP 111 receives a task and corresponding goals from the feed-forward planning of tasks 105. The PBP 111 then performs one or more behaviors to complete the received task. In FIG. 8, the PBP 111 is shown in more detail.

FIG. 8 is a diagram of an example of a runtime subsystem of an artificial intelligence reasoning system 800 that is trained to select and enact a behavior for performance in a particular environment. The system 800 includes an environment module 803, a perception for planning module 802, behavior library module 806, learned affective landscape module 807, and perception for evaluation module 820.

In some implementations, the environment module 803 can represent an input unit that has an application programming interface (API) configured to receive sensor data generated by one or more sensors in real time. The sensor data can include one or more sensed attributes of a current environment generated by the one or more sensors. In some implementations, the received sensor data can be provided as inputs to the modules 802, 806, 807, 820 and enable the respective modules 802, 806, 807, 820 to process data representing sensed attributes of the current environment that are generated in real-time. In some implementations, the one or more sensors can be mounted to an agent system that is configured to receive instructions from the system 800 regarding selection of a particular behavior and triggering of performance of the behavior. In other implementations, the environment module 802 can include the one or more sensors themselves as part of system 800.

In either implementation, the one or more sensors can include one or more light sensors, one or more temperature sensors, one or more infrared sensors, one or more LIDAR sensors, one or more gyroscopes, one or more accelerometers, one or more contact sensors, one or more magnetometers, one or more humidity sensors, one or more sound pressure level sensors, one or more atmospheric pressure sensors, one or more infrared light sensors, one or more electromagnetic radiation sensors, other environmental sensors, or any combination thereof.

In some implementations, each of the modules 802, 806, 807, 820 can be implemented using machine learning models such as one or more neural networks. In such implementations, each of these neural networks of the system 800 can collaborate with one another in order to select and initiate performance of a behavior that can be used to implement a task. In the example of system 800 depicted in FIG. 8, decisions based on one or more output data items from the modules 802, 806, 807, 820 are illustrated with diamond shapes such as the select and enact behavior module 810 and affect rating of success module 822. Some elements of FIG. 8 that are depicted as rectangles with dashed borders can represent an update in obtained sensor data such as the change in environment block 818. Other elements that are depicted as rectangles with dashed borders can represent the output of a decision module that is graphically depicted for ease of understanding the underlying process and subsequent stages such as success block 825 and not success block 830.

Though modules 802, 806, 807, and 820 can include machine learning models such as one or more neural networks, the present disclosure need not be so limited. For example, in some implementations, the learned affective landscape can be implemented using collaborative filtering. By way of another example, the behavior library 806 can include a database of records indicating a list of behaviors that have been used to perform a task in a particular environment. In some implementations, this list of behaviors can include a list of behaviors that have been performed to successfully complete a task. In other implementations, the list of behaviors can include all behaviors that have been selected and initiated by the system 800 including behaviors that have been successful in completing a task in a particular environment and behaviors that have not been successful in completing a task in a particular environment. Accordingly, implementations of the present disclosure can be employed that implement one or more of the modules 802, 806, 807, 820 in manner that achieves their described functionality without the using a machine learning model such as a neural network for each module.

The process of training the system 800 is described with reference to FIG. 8 as proceeding from stage A to stage M. Stage A shows input 801 being received by the system 800. The input 801 is sent to the perception for planning module, which in this implementation, may be implemented using a neural network 802. The input 801 can include data describing a definition of a particular task to perform. In some implementations, the definition of the particular task can include data describing one or more goals related to success or failure modes of performance of the particular task.

Stage B shows the perception for planning neural network 802 receiving the input 801. The perception for planning neural network 802 is configured to receive one or more types of input data describing sensed attributes of a current environment. In some instances, data describing sensed attributes of the environment can be obtained from one or more sensors on an agent system that is carrying out one or more tasks or behaviors related to completing a project. In other cases, data from the environment can be obtained from another device. In yet other implementations, the one or more sensors may be part of the system 800. The one or more types of input data related to a current environment can be forms of visual data, audio data, tactical data, odors, or other forms of sensory data related to an environment.

Stage C shows sensor data from the environment module 803 can be provided as an input to not only the perception for planning neural network 802—but also the behavior library 806 and the learned affective landscape 807. As discussed above, the environment module 803 can be an API that is configured to interface, in real time, with one or more sensors in a manner that enables the environment module 803 to receive sensed attributes describing features of a current environment in a vicinity of an agent that is performing one or more tasks related to a project.

Stage D shows data from the environment module 803 being received at the behavior library 806. In some implementations, the behavior library 806 can include a list of behaviors that have been used to perform a task in a particular environment. In some implementations, this list of behaviors can include a list of behaviors that have been performed to successfully complete a task. In some implementations, the list of behaviors can be indexed by the behavior's predicted changes in the environment. However, other implementations include a different list of behaviors. For example, in other implementations, the list of behaviors can include all behaviors that have been selected and initiated by the system 800 including behaviors that have been successful in completing a task in a particular environment and behaviors that have not been successful in completing a task in a particular environment. Like the prior example, this list of behaviors in this example can also be indexed by the behavior's predicted changes in the environment.

In some implementations, a behavior library can be implemented using a database without any machine learning techniques. In such implementations, the behavior library can be configured to query or filter database entries based on received sensor data from the environment module 803. In other implementations, the behavior library can be implemented using one or more machine learning modules such as a neural networks. In such implementations, the received sensor data from the environment module 803 can be vectorized and provided as an input environment vector to the neural network that has been trained to identify a class of behaviors that were selected and initiated in an environment that matches the input environment vector within a predetermined similarity method.

The behavior library 806 can communicate with the learned affective landscape 807. As shown in stage E, the learned affective landscape module 807, also referred to as an affective experience module, can store data that relates (i) behaviors for performing a task, (ii) historical environment data, and (iii) a success rate for the behavior successfully completing the task within the environment. In some implementations, this can include the learned affective landscape 807 storing one or more tasks or behaviors taken at a given time, associating the one or more tasks or behaviors taken at the given time with environmental data obtained also at that time, and then storing the result of performing one or more tasks or behaviors, in particular, whether or not performing the one or more tasks was successful. In this way, the learned affective landscape 807 can define likely successful tasks, behaviors, or actions based on a given task of project to complete and environmental data obtained at a given time.

The learned affective landscape module 807 can function like a human brain's emotional component to select a single behavior from each of plurality of behaviors stored by the behavior library 806. In this example, the behavior library 806 can function like a human brain's long term memory, thereby creating a record of each of the behaviors the system 800 have selected and initiating for tasks in a particular historical environment. The learned affective landscape module 807 can achieve this functionality using one or more neural networks as outline below. Though an example of this functionality is described using one or more neural networks, the functionality of the learned affective landscape module 807 can also be achieved using non-machine learning techniques such as collaborative filtering techniques.

In one implementation, the affective landscape module 807 can be trained using, for example, the system shown in FIG. 3B, to generating output data representing a behavior that is to be performed for a particular task. In some implementations, the behavior represented by the output data can be a behavior that is likely to be the most successful behavior for performing the task. The behavior can be determined to be "most likely successful" because one factor processed by the neural network is the historical success rate for the behavior in historical environments corresponding to the current environment.

Accordingly, the learned affective landscape 807 can be a form of filtering. For example, the learned affective landscape 807 can select a particular behavior from the behavior library as an input to the perception for planning module 802 based, at least in part, on real-time sensor data that describes the current environment, which is obtained from the environment module 803. In some implementations, this can be achieved using a collaborative filtering. In other implementations, this can be achieved using a neural network that has been trained to generate output data representing a particular behavior that can be used to perform a task in a particular environment based on the neural network processing input data that includes (i) first data representing real-time sensor data describing sensed attributes of the current environment, (ii) second data representing a target end state for the task, and (iii) third data representing one or more inputs from a behavior library indicating a level of success of historical behaviors performed in historical environments that were similar to the current environment defined by the real-time sensor data. In some implementations, the third data can include alternatively include historical data representing successes and failures of a particular task sequence or behavior when the task sequence or behavior was performed in a historical environment that corresponds to the current environmental state.

The historical data input into the affective landscape model be filtered from the behavioral library based on the sensor data received by the behavioral library that described the current environmental state. That is, for the affective landscape module 807 need not process behavior data corresponding to behaviors performed in different environments. In some implementations, the output generated by the learned affective landscape module 807 can represent a most successful behavior that can be used to complete the task for the current environment. In other implementations, the output of the learned affective landscape module 807 can include multiple candidate behaviors for the current environment defined by the sensor data.

Item 808 shows communication between the perception for planning neural network 802 and the learned affective landscape 807. For example, the perception for planning neural network 802 can obtain output data generated by the learned affective landscape 807 that represents one or more candidate behaviors for completing the task defined by 801. Thus, in one implementation, the perception for planning neural network 802 can be trained to generate output data representing a particular behavior selected by the perception for planning module 802 based on the perception for planning module processing input data that includes a task definition 801, sensor data describing the current environment from the current environment module 803, and output data generated by the learned affective landscape module 807. In the short term, the perception for planning module 802 may generate output data representing a particular behavior that skews towards the behavior recommended by the output data generated by the learned affective landscape module 807. However, over time, the perception for planning module 802 can be retrained based on feedback 831 that allows the perception for planning module 802 to make improved behavior selections over time. Thus, while the learned affective landscape 807 provides a behavior selection recommendation that is similar to an emotional human response in that it is correlated based on historical success rates, the system 800 can learn to refine those behavior selections over time based on learned feedback 831. Accordingly, much like a human brain can learn based on a person's experiences, the system 800 can use the feedback loop that feeds into the perception for planning module 802 to make improved behavior selection inferences over time.

In stage F, a output data, which is generated by the perception for planning neural network 802, represents a particular behavior, and is informed by the learned affective landscape 807 can be selected, by the select and enact behavior module 810, for performance to complete the goals of the task. The select and enact behavior module 810 can generate a predicted environmental state after performance of the behavior represented by the output data generated by the perception for planning module 810. For example, the select and enact behavior module 810 can simulate an expected change of the current environment based on performance of the behavior represented by the output data and use the results of the simulation as a predicted environment. In some implementations, the select and enact behavior module 610 can include a machine learning model such as one or more neural networks that have been trained to generate data representing a predicted environmental state by processing data representing an actual environmental state, a behavior, and one or more tasks.

The select and enact behavior module 810 can provide data representing the predicted environmental state as an input to the perception for evaluation neural network 820 as shown in item 814. The select and enact behavior module 810 can further enact the behavior within the environment 803 as shown in item 812. Once the selected behavior is performed in the current environment, the environment module 803 can obtain sensors data 818 generated by the one or more sensors that results in a change or changes in the current environment Stage G shows a data element containing a change in the environment 818. The data element 818 is shown for visualization purposes. The data element 818 is a result of the behavior from the perception for planning neural network 802 being enacted, for example, by an agent system, within the current environment. For example, an agent carrying out the behavior within an environment may adjust its position in the environment. The change in position can result in a change in the sensed attributes measured by one or more sensors monitoring the environment. This change in environment, represented by sensor data generated by one or more sensors, can be provided as input 819 to the perception for evaluation module 820. In some implementations, multiple, simultaneous changes in the environment from one enacted behavior are possible.

Stage H shows the perception for evaluation module 820 receiving both the predicted environmental state 814 generated by the select and enact behavior module 810 and the sensor data representing the change in environment 819. The perception for evaluation module 820 is configured to process the predicted environmental state 814 based on enactment of the behavior 812 and the sensor data representing the actual environmental state after enactment of the behavior 812 in order to determine a difference value between the predicted environmental state 814 and the actual environmental state 819. In some implementations, the perception for evaluation 820 is a neural network that is trained to generate output data the represents level of similarity between the predicted environment state 814 and the actual environment state 819. In other implementations, the perception for evaluation module 820 can include a vector similarity unit. In such implementations, the predicted environmental state 814 and actual environmental state 819 can be vectorized. Then, the vector similarity unit can determine a level of similarity between the two vectors. In such implementations, the distance between vectors in a vector space an provide an indication in the similarity between the predicted environment and the actual environment, with vectors having a smaller distance between them indicating respective environments are more similar with larger distances between vectors indicating respective environments that are more different.

In some implementations, processes involving calculating and obtaining the changes in environment 818 is performed within the perception for evaluation 820. The difference value can be a form of multi-dimensional vector comparing one data set representing a predicted environmental state with another data set representing an actual perceived environmental state. In some implementations, the difference value can be used to train elements of the system 800 including the perception for planning neural network 802 to better predict environmental states. In some implementations, the difference value is evaluated using a threshold, to determine if re-evaluation of the behavior is needed. In other implementations, affective experience related to the difference value is stored, relating historical experience of success and failure to different levels of the difference value. In all instances, high levels of the difference value constitute surprise to the artificial intelligence reasoning system, and result in higher levels of activation and re-planning than lower levels of the difference value.

Stage I shows a decision model that configured to evaluate the output from the perception for evaluation module 820. The affect rating of success module 822 shows a visualization of the process of determining either a success 825 or not a success 830. In some implementations, affect rating of success module 822 can indicate that the completion of the task using the enacted behavior 812 was a success 825 if the predicted environmental state 814 satisfies a predetermined level of similarity to the actual environmental state 819. Alternatively, if the affect ration of success module 825 can indicate that the completion of the task using the enacted behavior 812 was not a success 830 if the predicted environmental state 814 does not satisfy a predetermined level of similarity to the actual environmental state 819.

Stage J shows the success 825 branch of the affect rating of success module 822. The success 825 branch can be executed if the success criteria for the goal related to the task of the input 801 is met. By way of example, if the goal and criteria are met by based on an evaluation of the perceived changes in the environment, the using the enacted behavior to complete the task was a success. The perceived changes in the environment can include the difference between the predicted environmental state and the actual environmental state.

Stage K shows the output 827 containing information of the success. In some implementations, during the training stage, elements of the system 800, including the perception for planning neural network 802 can use data related to the output 827 to improve aspects of its neural network. For example, in some implementations, the output 827 can be used to further train the learned affective landscape 807.

Stage L shows the not success 830 branch of the affect rating of success module 822. By way of example, if the goal and criteria are not met by based on an evaluation of the perceived changes in the environment, then using the enacted behavior to complete the task was not a success. If the task is not a success, as determined based on an evaluation of the predicted environmental state 814 and the actual environmental state 819, then fail criteria 831 related to the given task can be communicated back to the perception for planning neural network 802. In some implementations, specific environment data related to the given task as well as behaviors performed can be included in the feedback 831.

Stage M shows output related to a failure 835 as determined in FIG. 8 in the affect rating of success module 822. In some implementations, elements of the system 800, including the perception for planning neural network 802 or the learned affective landscape 807 can use data related to the output related to a failure 835 to improve aspects of their neural networks. For example data related to the failure such as fail criteria 831 related to a given task can be provided back to the perception for planning neural network 802 and used to train the network 802 to, for example, penalize the perception for planning neural network 802 for selecting the enacted behavior 812, which failed in this instance, for use in attempting to complete the task. Penalizing the perception for planning neural network 802 can include, for example, adjusting one or more weights or parameters of the perception for planning neural network 802 in a manner that reduces the likelihood that the perception for planning neural network 802 would select the same behavior for the same task in the future.

Figure 9:
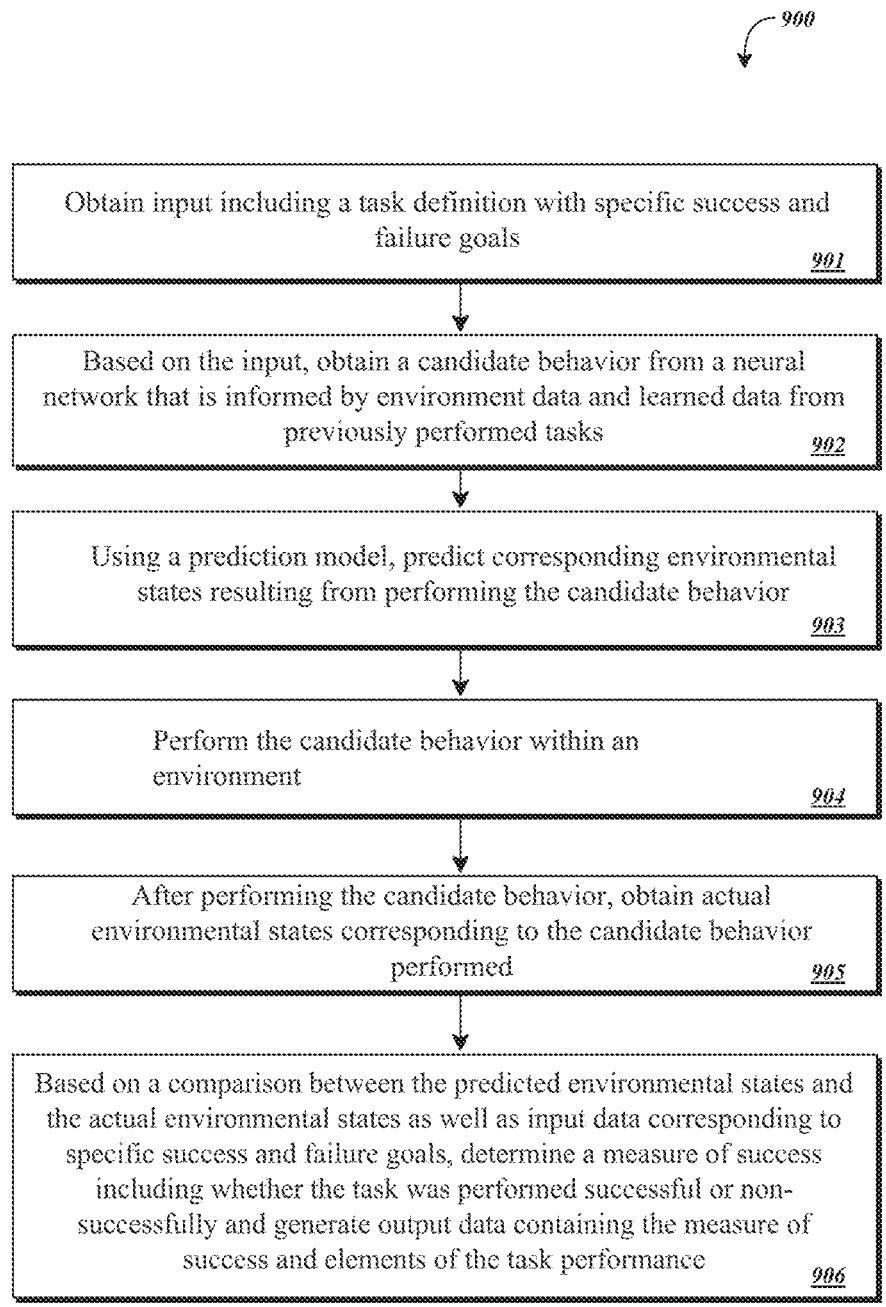
FIG. 9 is a flowchart of an example of a runtime process performed by a subsystem of an artificial intelligence reasoning system that is trained to select and enact a behavior for performance in a particular environment.

FIG. 9 is a flowchart showing an example of a runtime process 900 of a trained element of an artificial intelligence reasoning system. The process 900 can be performed by one or more computer elements such as the system 800 of FIG. 8. The elements of the process 900 are similar to the elements of the process 700 of FIG. 7. The process 700 represents training with regard to one task whereas the process 900 represents the processing of one task, after one or more training sessions have occurred, at runtime.

The process 900 includes obtaining input including a task definition with specific success and failure goals (901). For example, the input 801 can be used as input to the system 800 of FIG. 8.

The process 900 includes, based on the input, obtaining a candidate behavior from a neural network that is informed by environment data and learned data from previously performed tasks (902). For example, the learned affective landscape 807 of FIG. 8 can be used to inform the choice of a candidate behavior. By associating behaviors with environment and measurements of success, the learned affective landscape 807 enables subsequent informed selection on behavior. The learned affective landscape 807 tends to aid in choosing behaviors that result in successful task completions based on environment data as well as success or failure goals.

The process 900 includes predicting, by using a prediction model, corresponding environmental states resulting from performing the candidate behavior (903). For example, the perception for planning neural network 802 can predict a subsequent environmental state based on the predicted effect of performing a given behavior. The perception for planning neural network 802 represents another neural network that can be trained based on processed data.

In some implementations, a perception for planning neural network is trained before runtime. For example, one or more training data sets are inputted into the perception for planning neural network 802 to obtain a trained neural network. The trained neural network can then be used at runtime for operations such as predicting environmental states based on predicted effects of performing a behavior in an environment.

In some implementations, a perception for planning neural network is trained during runtime. For example, the perception for planning neural network 802 can receive updates based on feedback. Aspects of a feedback loop are discussed later in this specification.

The process 900 includes performing the candidate behavior within an environment (904). For example, as shown in FIG. 8, the perception for planning neural network 802 provides a candidate behavior that is then performed in the environment 803.

The process 900 includes, after performing the candidate behavior, obtaining actual environmental states corresponding to the candidate behavior performed (905). For example, as shown in FIG. 8, the change in environment 818 data element derived from the environment is a representation of one or more pieces of data gathered from the environment 803 in response to a behavior being performed in the environment 803. The pieces of data can be obtained by sensors affixed to an agent performing one or more of the behaviors within the environment 803 or by one or more other elements connected to a system such as the system 800 that can detect, record, and transfer perceptual data types (e.g., visual data, audio data, etc.).

The process 900 includes, based on a comparison between the predicted environmental states and the actual environmental states as well as input data corresponding to specific success and failure goals, determine a measure of success including whether the task was performed successful or non-successfully and generate output data containing the measure of success and elements of the task performance (906). For example, in FIG. 8, the perception for evaluation 820 illustrates the process of assessing a difference between a predicted change of an environmental state related to the environment 803 determined by the perception for planning neural network 802 and an actual change of an environmental state related to the environment 803 obtained from sensors or other data resources with access to the environment 803.

Figure 10:
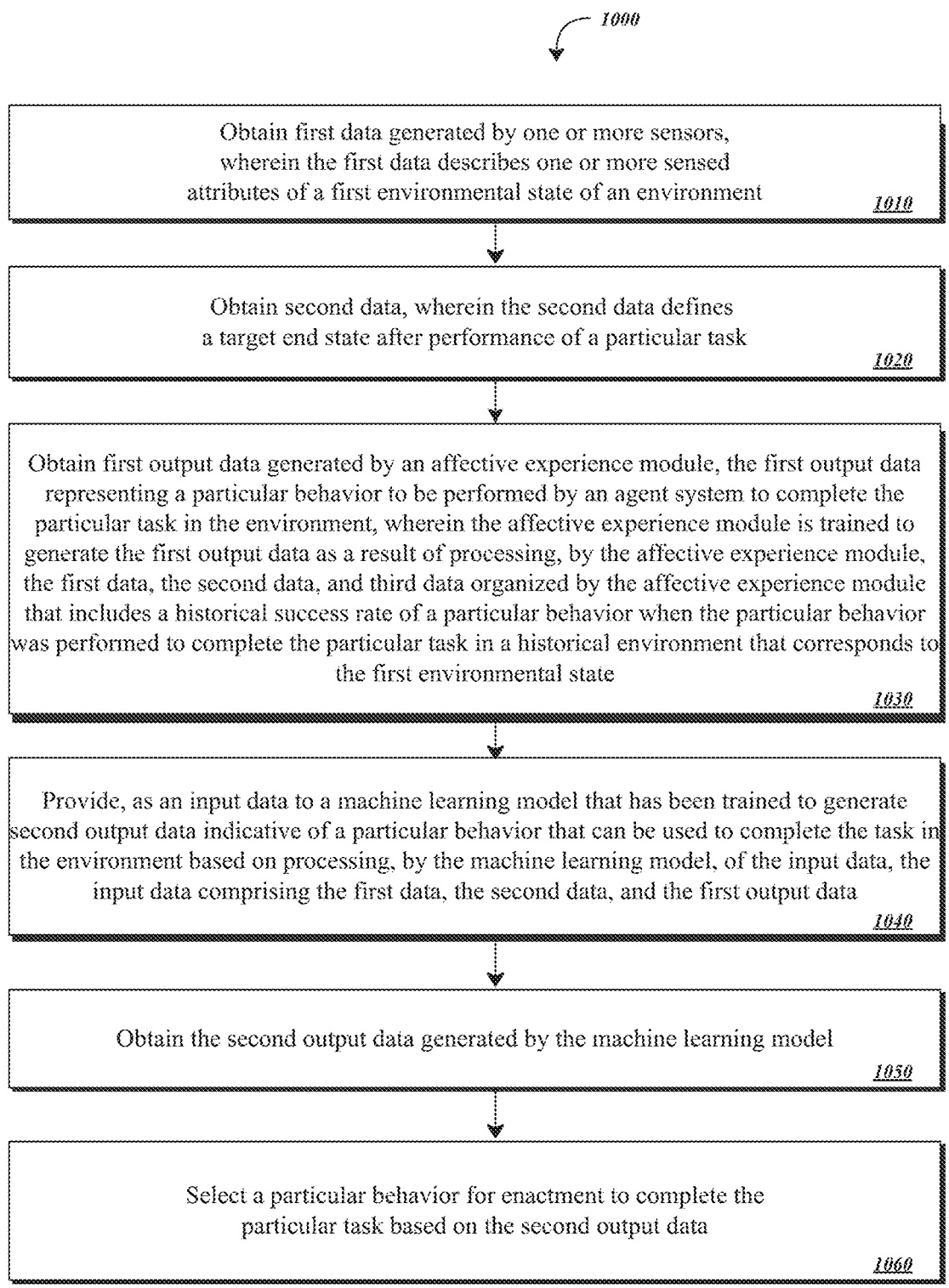
FIG. 10 is a flowchart of an example of a process for generalizing a learned behavior across different tasks.

FIG. 10 is a flowchart of an example of a process 1000 for generalizing a learned behavior across different tasks. In some implementations, the process 1000 can executed by a system, such as the system 600 or system 800, during the course of selecting and enacting a behavior for performance in a particular environment. That is, such a system can perform the process 1000 while training or during runtime after the system has been trained.

The system can begin performance of the process 1000 by obtaining first data generated by one or more sensors, wherein the first data describes one or more sensed attributes of a first environmental state of an environment (1010). In some implementations, such as a runtime implementation, the first data can include data that was generated by one or more sensors that actually sensed the attributes of the first environmental state of the environment. In other implementations, such as a training implementation, the first data can include data that was generated by a simulator to represent sensed attributes of the first environmental state of the environment.

The system can continue performance of the process 1000 by obtaining second data, wherein the second data defines a target end state after performance of a particular task (1020). In some implementations, the target end state may be obtained by a feed-forward planning system such as the feed-forward planning of tasks system 105 or feed-forward system 1100.

The system can continue performance of the process 1000 by obtaining first output data generated by an affective experience module, the first output data representing a particular behavior to be performed by an agent system to complete the particular task in the environment, wherein the affective experience module is trained to generate the first output data as a result of processing, by the affective experience module, the first data, the second data, and third data organized by the affective experience module that includes a historical success rate of a particular behavior when the particular behavior was performed to complete the particular task in a historical environment that corresponds to the first environmental state (1030). In some implementations, the affective experience module can include learned affective landscape 607 or 807. In some implementations, the affective landscape module can be implemented using one or more machine learning models such as one or more neural networks. Such machine learning models can be trained to make an inference of particular output data based on the processing of a system of input data. In other implementations, the affective landscape module can be implemented using algorithms using non-inference based computing algorithms such as collaborative filtering. In some implementations, the historical environment corresponds to the first environmental state if the historical environment satisfies a predetermined level of similarity to the first environmental state.

The system can continue performance of the process 1000 by providing, as an input data to a machine learning model that has been trained to generate second output data indicative of a particular behavior that can be used to complete the task in the environment based on processing, by the machine learning model, of the input data, the input data comprising the first data, the second data, and the first output data (1040). In some implementations, the machine learning model can include the one or more machine learning models used to implement the perception for planning module 602 or 802. In some implementations, the one or more machine learning models can include one or more neural networks trained to perform the operations of the perception for planning module described herein above.

The system can continue performance of the process 1000 by obtaining the second output data generated by the machine learning model (1050). In some implementations, the second output data can include indicative of a particular behavior that can be used to complete the task in the environment.

The system can continue performance of the process 1000 by selecting a particular behavior for enactment to complete the particular task based on the second output data (1060). For example, the system can identify, using the second output data, the particular behavior that is to be performed by an agent system to complete the task.

In some implementations, the process 1000 can conclude the process 1000 after performance of stage 1060. In other implementations, the system can continue the process 1000 with one or more subsequent stages that include instructing the agent system to enact the particular behavior to complete the particular task, and generating a predicted environmental state of the environment, wherein the predicted environmental state is an expected environmental state after successful completion of the particular task, by the agent system, using the particular behavior. In some implementations, the system can use the select and enact behavior module 610, 810 to generate the predicted environmental state. Such a select and enact behavior module may be part of, or separate from, the perception for planning module 602, 802. In some implementations, the predicted environmental state is determined based on output data generated by a neural network that has been trained to generate output data representing a predicted environmental state based on the neural network processing input data that comprises (i) data representing the particular task, (ii) data representing the first environmental state, and (iii) data that represents the particular behavior.

In some implementations, after performance of the process 1000, the system can further include after the agent system enacts the particular behavior obtaining fourth data generated by the one or more sensors, wherein the fourth data describes one or more sensed attributes of a second environmental state of the environment, the second environmental state representative of an actual environmental state of the environment after the agent system enacts the particular behavior. In such implementations, the system can determine a level of similarity between the second environmental state and the predicted environmental state. Such a determination can be achieve using one or more trained machine learning models such as the perception for evaluation module 620, 820. In some implementations, the system can determine whether the enactment, by the agent system, of the particular behavior to complete the task was successful or not successful based on the level of similarity between the second environmental state and the predicted environmental state. Such a determination can be performed by, for example, an affect rating of success module 622, 822 that evaluates the output of the perception for evaluation module 620, 820. Such affect rating of success module 622, 822 can be part of, or separate from, the perception for evaluation module 620, 820.

Figure 11:
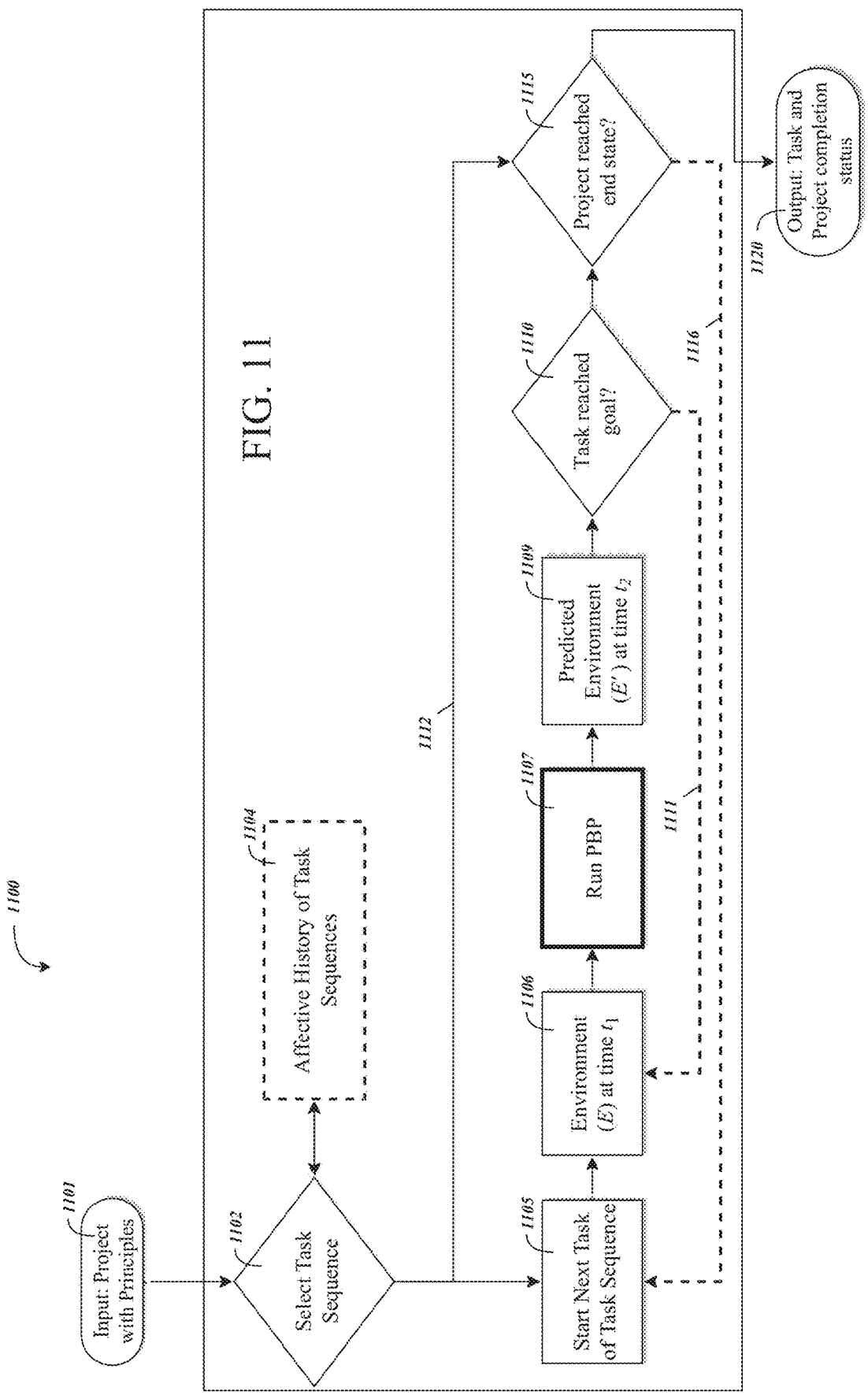
FIG. 11 is a diagram of an example of a feed-forward system for completing and processing a project.

FIG. 11 is a diagram of an example of a feed-forward system 1100 for completing and processing a project. The feed-forward system 1100 includes an affective history of task sequences 1104 that is used to determine a sequence tasks to be performed. The feed-forward system 1100 also includes a run PBP item 1107. The run PBP 1107 item relates to aspects discussed previously in the specification, for example, stages B, F, and H from FIG. 6. The run PBP 1107 is shown functioning with other data element resources and decision elements for illustration purposes. Elements of FIG. 11 can be achieved with one or more electronic systems realized in computer architecture including neural networks or collaborative filtering techniques. The run PBP 1107 can be a neural network or a form of collaborative filter.

The system 1100 receives an input 1101 that details a definition of a project together with corresponding general principles governing success or failure as it relates to the completion of the project. Based on the input 1101, a sequence of tasks, chosen based on a highest likelihood of successfully completing the project, are chosen as shown in item 1102. The sequence of tasks is chosen based on the affective history of task sequences 1104. The affective history of task sequences 1104 represents a way in which one or more task sequences are correlated together, not only with environmental data but also with a measure of success.

The affective history of task sequences 1104 can, by finding similar environmental data and project details, find one or more task sequences that are likely to result in a successful completion of a given project.

The sequence of tasks, containing one or more tasks is chosen as shown in item 1102. In the example of FIG. 11, the sequence of tasks is performed one task at a time starting with a first task. In cases where the sequence of tasks contains more than one task, the next task is performed after the first task. Start next task of task sequence 1105 illustrates the process of performing one task after another.

In some implementations, parallel processing of projects, tasks, or behaviors may be possible. For example, an agent performing one or more actions can have one or more additional action abilities. In some cases, the action abilities are independent of one another. A project related to one action ability, such as moving from one place to another, can be separately processed while another project dealing with an intellectual problem or other type, can be performed in parallel.

After one task from among the one or more tasks within the candidate task sequence is chosen, environment data at a time $t_1$ is obtained from one or more data resources to create a dataset representing an environment at time $t_1$. After the data representing the environment at time $t_1$ is obtained, the run PBP 1107 is performed.

The run PBP 1107 is discussed in reference to at least FIG. 6 discussed above and relates to the process of predicting based on experience and environmental data what the change will be in an environment after a behavior is performed. The behavior in this case is performed with the goal of successfully completing the task or successfully being performed with one or more other behaviors to perform a task.

After the run PBP 1107, a prediction of environment data at a time $t_2$ is determined as shown in item 1109 from one or more data resources to create a dataset representing an environment at time $t_2$.

After the run PBP 1107, the system 1100 assesses the current status of the project. In some cases, this involves assessing environmental data or data related to goals or principles. If the task is not complete after performing one or more behaviors, then one or more additional behaviors should be performed. This is shown visually in item 1111 where the run PBP 1107 can be run multiple times for multiple different behaviors related to a given task.

After a given task is completed, the system 1100 can again assess to see whether the project has reached an end state. The assessment is shown in item 1115 of FIG. 11. The project status assessment 1115 receives input from the original task sequence or input 1101 to determine if the project has reached an end state. If the project has not reached an end state, one or more additional tasks can be performed as shown in item 1116 pointing back to the start next task of sequence item 1105. If the project has reached an end state, the project status assessment 1115 can generate output 1120 that can include task or project completion status.

Figure 12:
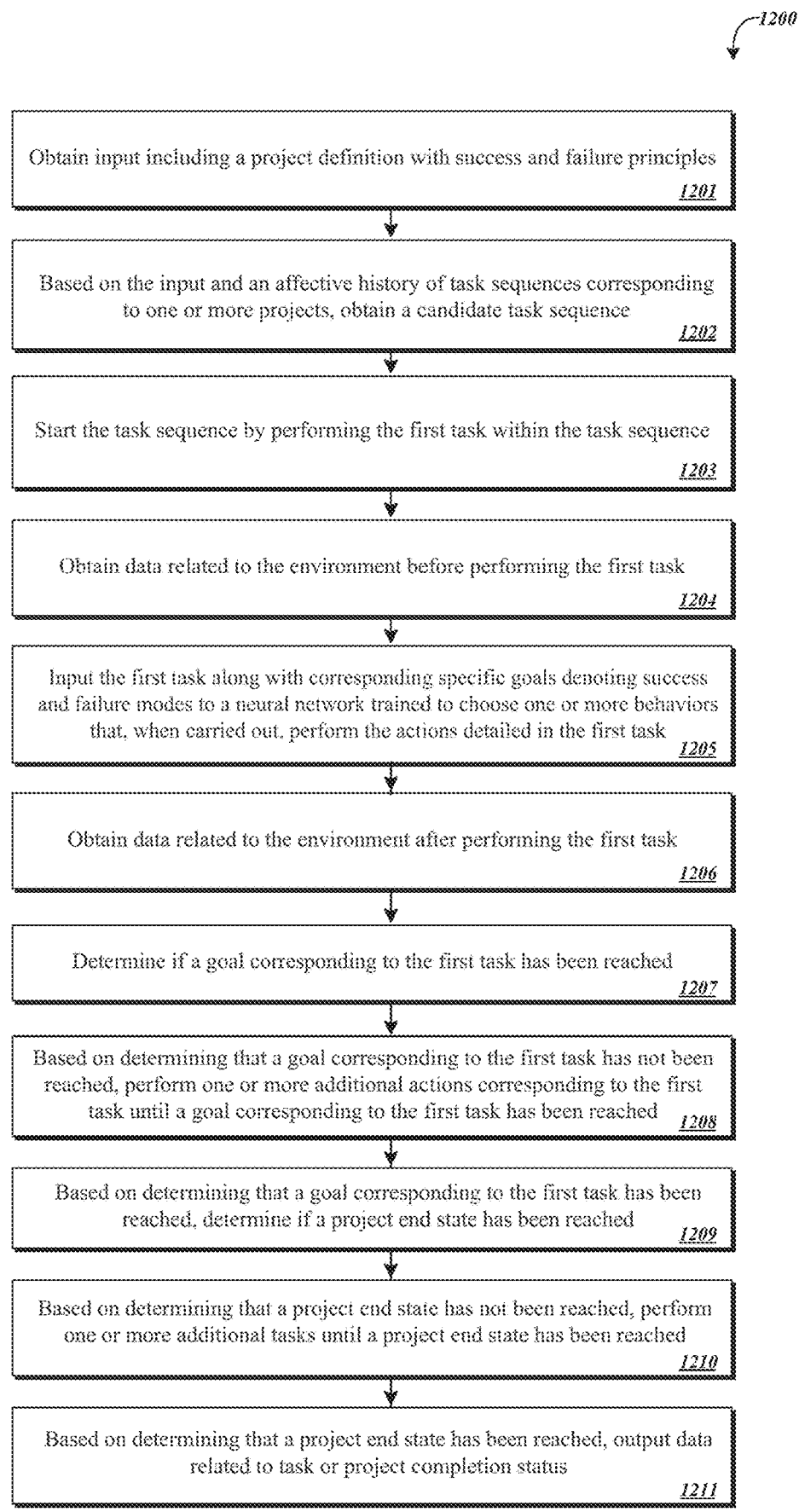
FIG. 12 is a flowchart showing an example of a process that can be executed by a feed-forward system for completing and processing a project.

FIG. 12 is a flowchart showing an example of a process 1200 of a feed-forward system for completing and processing a project. The process 1200 can be performed by one or more electronic device or systems such as the system 1100 of FIG. 11.

The process 1200 includes obtaining input including a project definition with success and failure principles (1201). For example, the system 1100 receives an input 1101 that details a definition of a project together with corresponding general principles governing success or failure as it relates to the completion of the project.

The process 1200 includes, based on the input and an affective history of task sequences corresponding to one or more projects, obtaining a candidate task sequence (1202). For example, the sequence of tasks can be chosen based on the affective history of task sequences 1104. The affective history of task sequences 1104 represents a way in which one or more task sequences are correlated together, not only with environmental data but also with a measure of success. The affective history of task sequences 1104 can, by finding similar environmental data and project details, find one or more task sequences that are likely to result in a successful completion of a given project.

The process 1200 includes, starting the task sequence by performing the first task within the task sequence (1203). For example, start next task of task sequence 1105 illustrates the process of performing one task after another in the system 1100.

In some implementations, parallel processing of projects, tasks, or behaviors may be possible. For example, an agent performing one or more actions can have one or more additional action abilities. In some cases, the action abilities are independent of one another. A project related to one action ability, such as moving from one place to another, can be separately processed while another project dealing with an intellectual problem or other type, can be performed in parallel.

The process 1200 includes, obtaining data related to the environment before performing the first task (1204). For example, after one task from among the one or more tasks within the candidate task sequence is chosen, environment data at a time $t_1$ can be obtained from one or more data resources to create a dataset representing an environment at time $t_1$.

The process 1200 includes, inputting the first task along with corresponding specific goals denoting success and failure modes to a neural network trained to choose one or more behaviors that, when carried out, perform the actions detailed in the first task (1205). For example, the run PBP 1107 can be initiated where the run PBP 1107 involves the process of predicting based on experience and environmental data what the change will be in an environment after a behavior is performed. The behavior in this case is performed with the goal of successfully completing the task or successfully being performed with one or more other behaviors to perform a task. The run PBP 1107 also involves choosing one or more behaviors to carry out one or more aspects of a task. The task can be completed by the performance of one or more behaviors.

The process 1200 includes, obtaining data related to the environment after performing the first task (1206). For example, after the run PBP 1107, a prediction of environment data at a time $t_2$ can be determined as shown in item 1109 from one or more data resources to create a dataset representing an environment at time $t_2$.

The process 1200 includes determining if a goal corresponding to the first task has been reached (1207). For example, the system 1100 can assess the current status of the project currently being performed by the system 1100. In some cases, this involves assessing environmental data or data related to goals or principles. If the task is not complete after performing one or more behaviors, then one or more additional behaviors can be performed. This is shown visually in item 1111 where the run PBP 1107 can be run multiple times for multiple different behaviors related to a given task.

The process 1200 includes, based on determining that a goal corresponding to the first task has not been reached, performing one or more additional actions corresponding to the first task until a goal corresponding to the first task has been reached (1208). For example, item 1111 in FIG. 11 illustrates the process of performing one or more additional actions or behaviors corresponding to a task until the goal has been reached.

The process 1200 includes, based on determining that a goal corresponding to the first task has been reached, determining if a project end state has been reached (1209). For example, after a given task is completed, the system 1100 can assess whether the project has reached an end state. The assessment is shown in item 1115 of FIG. 11. The project status assessment 1115 receives input from the original task sequence or input 1101 to determine if the project has reached an end state.

The process 1200 includes, based on determining that a project end state has not been reached, performing one or more additional tasks until a project end state has been reached (1210). For example, one or more additional tasks can be performed as shown in item 1116 pointing back to the start next task of sequence item 1105 in FIG. 11.

The process 1200 includes, based on determining that a project end state has been reached, outputting output data related to task or project completion status (1211). For example, the project status assessment 1115 can generate output 1120 that can include task or project completion status.

Figure 13:
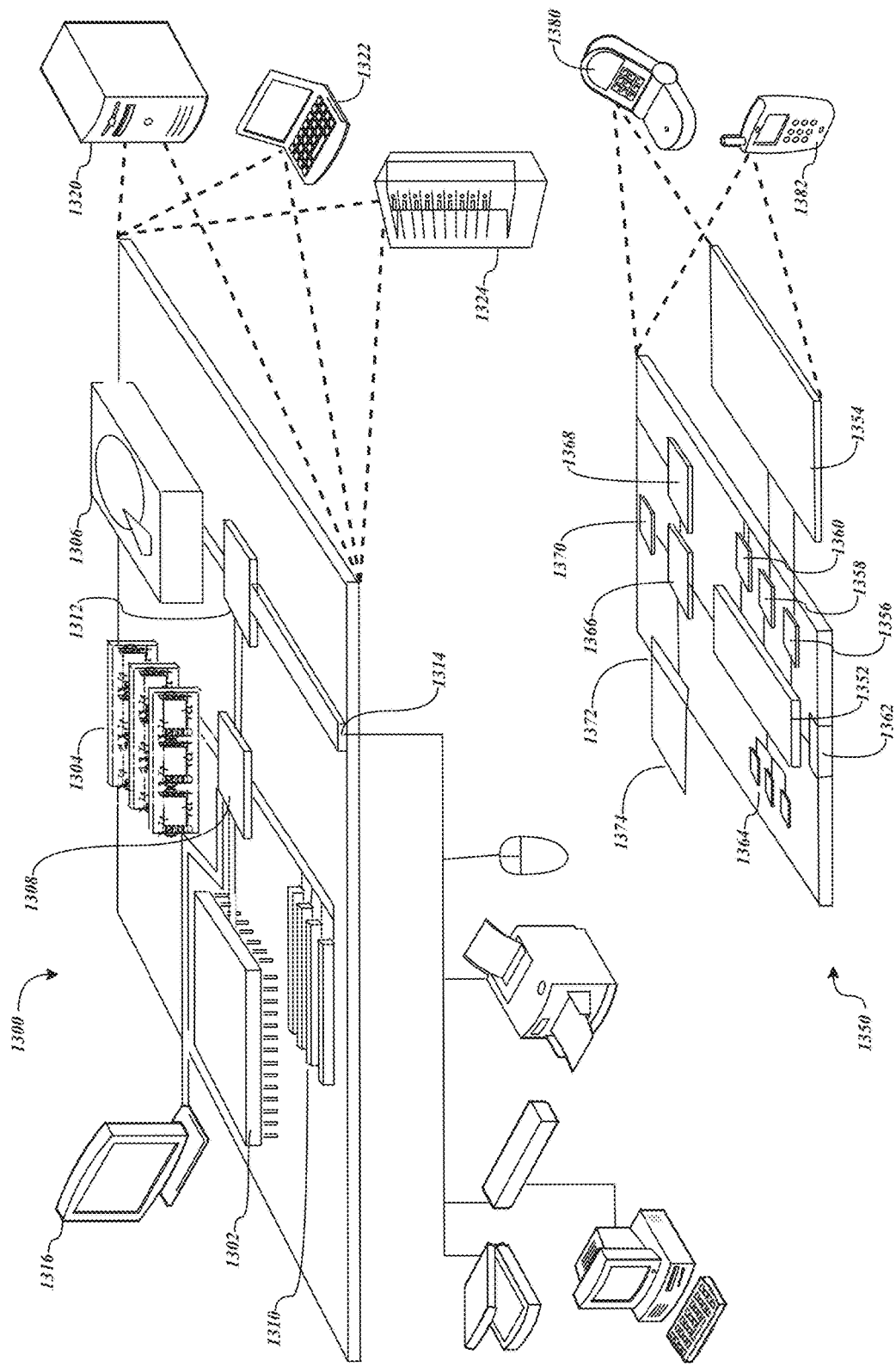
FIG. 13 is a block diagram of an example of system components that can be used to implement an artificial intelligence reasoning system.

FIG. 13 is a block diagram of an example of system 1300 components that can be used to implement, generate, and use identification templates for an artificial intelligence reasoning system.

Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smartphones, and other similar computing devices. Additionally, computing device 1300 or 1350 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the invention described and/or claimed in this document.

Computing device 1300 includes a processor 1302, memory 1304, a storage device 1308, a high-speed interface 1308 connecting to memory 1304 and high-speed expansion ports 1310, and a low speed interface 1312 connecting to low speed bus 1314 and storage device 1308. Each of the components 1302, 1304, 1308, 1308, 1310, and 1312, are interconnected using various busses, and can be mounted on a common motherboard or in other manners as appropriate. The processor 1302 can process instructions for execution within the computing device 1300, including instructions stored in the memory 1304 or on the storage device 1308 to display graphical information for a GUI on an external input/output device, such as display 1316 coupled to high speed interface 1308. In other implementations, multiple processors and/or multiple buses can be used, as appropriate, along with multiple memories and types of memory. Also, multiple computing devices 1300 can be connected, with each device providing portions of the necessary operations, e.g., as a server bank, a group of blade servers, or a multi-processor system.

The memory 1304 stores information within the computing device 1300. In one implementation, the memory 1304 is a volatile memory unit or units. In another implementation, the memory 1304 is a non-volatile memory unit or units. The memory 1304 can also be another form of computer-readable medium, such as a magnetic or optical disk.

The storage device 1308 is capable of providing mass storage for the computing device 1300. In one implementation, the storage device 1308 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 1304, the storage device 1308, or memory on processor 1302.

The high speed controller 1308 manages bandwidth-intensive operations for the computing device 1300, while the low speed controller 1312 manages lower bandwidth intensive operations. Such allocation of functions is exemplary only. In one implementation, the high-speed controller 1308 is coupled to memory 1304, display 1316, e.g., through a graphics processor or accelerator, and to high-speed expansion ports 1310, which can accept various expansion cards (not shown). In the implementation, low-speed controller 1312 is coupled to storage device 1308 and low-speed expansion port 1314. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 1300 can be implemented in a number of different forms, as shown in the figure. For example, it can be implemented as a standard server 1320, or multiple times in a group of such servers. It can also be implemented as part of a rack server system 1324. In addition, it can be implemented in a personal computer such as a laptop computer 1322. Alternatively, components from computing device 1300 can be combined with other components in a mobile device (not shown), such as device 1350. Each of such devices can contain one or more of computing device 1300, 1350, and an entire system can be made up of multiple computing devices 1300, 1350 communicating with each other.

The computing device 1300 can be implemented in a number of different forms, as shown in the figure. For example, it can be implemented as a standard server 1320, or multiple times in a group of such servers. It can also be implemented as part of a rack server system 1324. In addition, it can be implemented in a personal computer such as a laptop computer 1322. Alternatively, components from computing device 1300 can be combined with other components in a mobile device (not shown), such as device 1350. Each of such devices can contain one or more of computing device 1300, 1350, and an entire system can be made up of multiple computing devices 1300, 1350 communicating with each other Computing device 1350 includes a processor 1352, memory 1364, and an input/output device such as a display 1354, a communication interface 1366, and a transceiver 1368, among other components. The device 1350 can also be provided with a storage device, such as a micro-drive or other device, to provide additional storage. Each of the components 1350, 1352, 1364, 1354, 1366, and 1368, are interconnected using various buses, and several of the components can be mounted on a common motherboard or in other manners as appropriate.

The processor 1352 can execute instructions within the computing device 1350, including instructions stored in the memory 1364. The processor can be implemented as a chipset of chips that include separate and multiple analog and digital processors. Additionally, the processor can be implemented using any of a number of architectures. For example, the processor 1310 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 1350, such as control of user interfaces, applications run by device 1350, and wireless communication by device 1350.

Processor 1352 can communicate with a user through control interface 1358 and display interface 1356 coupled to a display 1354. The display 1354 can be, for example, a TFT (Thin-Film-Transistor Liquid Crystal Display) display or an OLED (Organic Light Emitting Diode) display, or other appropriate display technology. The display interface 1356 can comprise appropriate circuitry for driving the display 1354 to present graphical and other information to a user. The control interface 1358 can receive commands from a user and convert them for submission to the processor 1352. In addition, an external interface 1362 can be provide in communication with processor 1352, so as to enable near area communication of device 1350 with other devices. External interface 1362 can provide, for example, for wired communication in some implementations, or for wireless communication in other implementations, and multiple interfaces can also be used.

The memory 1364 stores information within the computing device 1350. The memory 1364 can be implemented as one or more of a computer-readable medium or media, a volatile memory unit or units, or a non-volatile memory unit or units. Expansion memory 1374 can also be provided and connected to device 1350 through expansion interface 1372, which can include, for example, a SIMM (Single In Line Memory Module) card interface. Such expansion memory 1374 can provide extra storage space for device 1350, or can also store applications or other information for device 1350. Specifically, expansion memory 1374 can include instructions to carry out or supplement the processes described above, and can include secure information also. Thus, for example, expansion memory 1374 can be provide as a security module for device 1350, and can be programmed with instructions that permit secure use of device 1350. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352 that can be received, for example, over transceiver 1368 or external interface 1362.

Device 1350 can communicate wirelessly through communication interface 1366, which can include digital signal processing circuitry where necessary. Communication interface 1366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 1368. In addition, short-range communication can occur, such as using a Bluetooth, Wi-Fi, or other such transceiver (not shown). In addition, GPS (Global Positioning System) receiver module 1370 can provide additional navigation- and location-related wireless data to device 1350, which can be used as appropriate by applications running on device 1350.

Device 1350 can also communicate audibly using audio codec 1360, which can receive spoken information from a user and convert it to usable digital information. Audio codec 1360 can likewise generate audible sound for a user, such as through a speaker, e.g., in a handset of device 1350. Such sound can include sound from voice telephone calls, can include recorded sound, e.g., voice messages, music files, etc. and can also include sound generated by applications operating on device 1350.

The computing device 1350 can be implemented in a number of different forms, as shown in the figure. For example, it can be implemented as a cellular telephone 1380. It can also be implemented as part of a smartphone 1382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language and/or neuromorphic programming. The neuromorphic programming can include action potentials or spikes. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user, a keyboard, a pointing device, e.g., a mouse or a trackball by which the user can provide input to the computer, and/or a brain-computer interface for detecting brain activity and inducing brain activity. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method for generalizing a learned behavior across different tasks, the method comprising:
    obtaining first data generated by one or more sensors, wherein the first data describes one or more sensed attributes of a first environmental state of an environment;
    obtaining second data, wherein the second data defines a target end state after performance of a particular task;
    obtaining first output data generated by an affective experience module, the first output data representing a particular behavior to be performed by an agent system to complete the particular task in the environment, wherein the affective experience module is trained to generate the first output data as a result of processing, by the affective experience module, the first data, the second data, and third data organized by the affective experience module that includes a historical success rate of a particular behavior when the particular behavior was performed to complete the particular task in a historical environment that corresponds to the first environmental state;
    providing, as an input data to a machine learning model that has been trained to generate second output data indicative of a particular behavior that can be used to complete the task in the environment based on processing, by the machine learning model, of the input data, the input data comprising the first data, the second data, and the first output data;
    obtaining the second output data generated by the machine learning model; and
    selecting a particular behavior for enactment to complete the particular task based on the second output data.

2. The method of claim 1, wherein the historical environment corresponds to the first environmental state if the historical environment satisfies a predetermined level of similarity to the first environmental state.

3. The method of claim 1, wherein the affective experience module comprises one or more neural networks.

4. The method of claim 1, wherein the affective experience module comprises a collaborative filtering model.

5. The method of claim 1, the method further comprising:
    instructing the agent system to enact the particular behavior to complete the particular task; and
    generating a predicted environmental state of the environment, wherein the predicted environmental state is an expected environmental state after successful completion of the particular task, by the agent system, using the particular behavior.

6. The method of claim 5, the method further comprising:
    after the agent system enacts the particular behavior:
        obtaining fourth data generated by the one or more sensors, wherein the fourth data describes one or more sensed attributes of a second environmental state of the environment, the second environmental state representative of an actual environmental state of the environment after the agent system enacts the particular behavior;
        determining a level of similarity between the second environmental state and the predicted environmental state; and
        determining that the enactment, by the agent system, of the particular behavior to complete the task was successful or not successful based on the level of similarity between the second environmental state and the predicted environmental state.

7. A system comprising:
one or more computers and one or more storage devices storing instructions that are operable, when executed by the one or more computers, to cause the one or more computers to perform operations comprising:
    obtaining first data generated by one or more sensors, wherein the first data describes one or more sensed attributes of a first environmental state of an environment;
    obtaining second data, wherein the second data defines a target end state after performance of a particular task;
    obtaining first output data generated by an affective experience module, the first output data representing a particular behavior to be performed by an agent system to complete the particular task in the environment, wherein the affective experience module is trained to generate the first output data as a result of processing, by the affective experience module, the first data, the second data, and third data organized by the affective experience module that includes a historical success rate of a particular behavior when the particular behavior was performed to complete the particular task in a historical environment that corresponds to the first environmental state;

providing, as an input data to a machine learning model that has been trained to generate second output data indicative of a particular behavior that can be used to complete the task in the environment based on processing, by the machine learning model, of the input data, the input data comprising the first data, the second data, and the first output data;

obtaining the second output data generated by the machine learning model; and selecting a particular behavior for enactment to complete the particular task based on the second output data.

8. The system of claim 7, wherein the historical environment corresponds to the first environmental state if the historical environment satisfies a predetermined level of similarity to the first environmental state.

9. The system of claim 7, wherein the affective experience module comprises one or more neural networks.

10. The system of claim 7, wherein the affective experience module comprises a collaborative filtering model.

11. The system of claim 7, the operations further comprising:

instructing the agent system to enact the particular behavior to complete the particular task; and generating a predicted environmental state of the environment, wherein the predicted environmental state is an expected environmental state after successful completion of the particular task, by the agent system, using the particular behavior.

12. The system of claim 11, wherein the predicted environmental state is determined based on output data generated by a neural network that has been trained to generate output data representing a predicted environmental state based on the neural network processing input data that comprises (i) data representing the particular task, (ii) data representing the first environmental state, and (iii) data that represents the particular behavior.

13. The system of claim 11, the operations further comprising:

after the agent system enacts the particular behavior:

obtaining fourth data generated by the one or more sensors, wherein the fourth data describes one or more sensed attributes of a second environmental state of the environment, the second environmental state representative of an actual environmental state of the environment after the agent system enacts the particular behavior;

determining a level of similarity between the second environmental state and the predicted environmental state; and determining that the enactment, by the agent system, of the particular behavior to complete the task was successful or not successful based on the level of similarity between the second environmental state and the predicted environmental state.

14. A non-transitory computer-readable medium storing software comprising instructions executable by one or more computers which, upon such execution, cause the one or more computers to perform operations comprising:

obtaining first data generated by one or more sensors, wherein the first data describes one or more sensed attributes of a first environmental state of an environment;

obtaining second data, wherein the second data defines a target end state after performance of a particular task;

obtaining first output data generated by an affective experience module, the first output data representing a particular behavior to be performed by an agent system to complete the particular task in the environment, wherein the affective experience module is trained to generate the first output data as a result of processing, by the affective experience module, the first data, the second data, and third data organized by the affective experience module that includes a historical success rate of a particular behavior when the particular behavior was performed to complete the particular task in a historical environment that corresponds to the first environmental state;

providing, as an input data to a machine learning model that has been trained to generate second output data indicative of a particular behavior that can be used to complete the task in the environment based on processing, by the machine learning model, of the input data, the input data comprising the first data, the second data, and the first output data;

obtaining the second output data generated by the machine learning model; and selecting a particular behavior for enactment to complete the particular task based on the second output data.

15. The computer-readable medium of claim 14, wherein the historical environment corresponds to the first environmental state if the historical environment satisfies a predetermined level of similarity to the first environmental state.

16. The computer-readable medium of claim 14, wherein the affective experience module comprises one or more neural networks.

17. The computer-readable medium of claim 14, wherein the affective experience module comprises a collaborative filtering model.

18. The computer-readable medium of claim 14, the operations further comprising:

instructing the agent system to enact the particular behavior to complete the particular task; and generating a predicted environmental state of the environment, wherein the predicted environmental state is an expected environmental state after successful completion of the particular task, by the agent system, using the particular behavior.

19. The computer-readable medium of claim 18, wherein the predicted environmental state is determined based on output data generated by a neural network that has been trained to generate output data representing a predicted environmental state based on the neural network processing input data that comprises (i) data representing the particular task, (ii) data representing the first environmental state, and (iii) data that represents the particular behavior.

20. The computer-readable medium of claim 18, the operations further comprising:

after the agent system enacts the particular behavior:

obtaining fourth data generated by the one or more sensors, wherein the fourth data describes one or more sensed attributes of a second environmental state of the environment, the second environmental state representative of an actual environmental state of the environment after the agent system enacts the particular behavior;

determining a level of similarity between the second environmental state and the predicted environmental state; and determining that the enactment, by the agent system, of the particular behavior to complete the task was successful or not successful based on the level of similarity between the second environmental state and the predicted environmental state.

\* \* \* \* \*